United States Patent
Choi et al.

(10) Patent No.: US 12,127,158 B2
(45) Date of Patent: Oct. 22, 2024

(54) GROUP-BASED POSITIONING DESIGN IN ASYNCHRONOUS VEHICULAR NETWORKS

(71) Applicant: QUALCOMM Incorporated, San Diego, CA (US)

(72) Inventors: Chang-Sik Choi, Seoul (KR); Kapil Gulati, Belle Mead, NJ (US); Gene Wesley Marsh, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/057,568

(22) Filed: Nov. 21, 2022

(65) Prior Publication Data

US 2023/0089793 A1  Mar. 23, 2023

Related U.S. Application Data

(63) Continuation of application No. 17/364,619, filed on Jun. 30, 2021, now Pat. No. 11,533,702.

(51) Int. Cl.
*H04W 76/00* (2018.01)
*G01S 19/46* (2010.01)
(Continued)

(52) U.S. Cl.
CPC .......... *H04W 64/006* (2013.01); *G01S 19/46* (2013.01); *H04L 5/0051* (2013.01)

(58) Field of Classification Search
CPC ....... H04W 64/006; H04W 4/46; H04W 4/70; H04W 76/23; H04W 76/14; H04W 92/18; G01S 19/46; G01S 13/765; H04L 5/0051
See application file for complete search history.

(56) References Cited

U.S. PATENT DOCUMENTS

| 10,785,080 B2 | 9/2020 | Islam et al. |
| 10,897,780 B2 | 1/2021 | Islam et al. |

(Continued)

FOREIGN PATENT DOCUMENTS

| EP | 3742829 A1 | 11/2020 |
| WO | 2018118491 A1 | 6/2018 |

(Continued)

OTHER PUBLICATIONS

International Search Report and Written Opinion—PCT/US2022/072627—ISA/EPO—dated Sep. 15, 2022.

(Continued)

*Primary Examiner* — Fred A Casca
(74) *Attorney, Agent, or Firm* — QUALCOMM Incorporated

(57) ABSTRACT

Disclosed are some examples of techniques for positioning of a user equipment (UE) using positioning reference signal (PRS). One or more units of messages may be communicated between an initiator UE and a responder UE. A unit of message may include a pre-PRS message, a PRS message and a post-PRS message. The pre-PRS message and the post-PRS message may be sent or received using a license spectrum. The PRS message may be sent or received using an unlicensed spectrum. The communication between the initiator UE and the responder UE may be initiated by the initiator UE identifying the responder UE from a plurality of UEs based on positioning properties of the responder UE. The positioning properties of the responder UE may include one or more of a direction, a velocity, a location confidence and a location of the responder UE.

30 Claims, 15 Drawing Sheets

(51) Int. Cl.
*H04L 5/00* (2006.01)
*H04W 64/00* (2009.01)

(56) References Cited

U.S. PATENT DOCUMENTS

| | | | |
|---|---|---|---|
| 11,533,702 | B1 | 12/2022 | Choi |
| 2020/0314728 | A1* | 10/2020 | Reimann .................. H04W 4/46 |
| 2021/0099832 | A1 | 4/2021 | Duan et al. |
| 2022/0173857 | A1 | 6/2022 | Michalopoulos et al. |
| 2022/0236365 | A1* | 7/2022 | Ko ........................ H04L 5/0048 |
| 2022/0279367 | A1 | 9/2022 | Hwang et al. |

FOREIGN PATENT DOCUMENTS

| | | |
|---|---|---|
| WO | 2019139730 | 7/2019 |
| WO | WO-2020246842 A1 | 12/2020 |

OTHER PUBLICATIONS

Qualcomm: "Email Discussion Summary for [RAN-R18-WS-non-eMBB-Qualcomm]", 3GPP TSG RAN Rel-18 workshop, RWS-210590, 3rd Generation Partnership Project, Mobile Competence Centre, 650, Route Des Lucioles, F-06921 Sophia-Antipolis Cedex, France, vol. RAN WG3, No. Electronic Meeting, Jun. 28-Jul. 2, 2021, Jun. 25, 2021, XP052029052, 146 Pages, Sections 5 and 16, p. 47, lines 11-16.

Qualcomm Incorporated: "Combined Downlink and Uplink NR Positioning Procedures", 3GPP TSG-RAN WG2 Meeting #1 05, R2-1901371, (Positioning Procedures), 3rd Generation Partnership Project, Mobile Competence Centre, 650, Route Des Lucioles, F-06921 Sophia-Antipolis Cedex, France, vol. RAN WG2, No. Athens, Greece, Feb. 25-Mar. 1, 2019, Feb. 15, 2019, 9 Pages, XP051602730, Sections 2-3, Figure 1.

Qualcomm: "On Sidelink Positioning", 3GPP TSG RAN Rel-18 workshop, RWS-210008, 3rd Generation Partnership Project, Mobile Competence Centre, 650, Route Des Lucioles, F-06921 Sophia Antipolis Cedex, France, vol. TSG RAN, No. Electronic Meeting, Jun. 28-Jul. 2, 2021, Jun. 7, 2021, 8 Pages, XP052025577.

Qualcomm Incorporated: "Ng-Ran Positioning Architecture and Procedures", 3GPP TSG-RAN WG3 Meeting #103, R3-190191, Athens, Greece, Feb. 25-Mar. 1, 2019, 10 Pages.

Qualcomm Incorporated: "On Unlicensed Positioning and Applicable Use Cases", 3GPP Draft, 3GPP RAN #86, RP-192527, 3rd Generation Partnership Project (3GPP), Mobile Competence Centre, 650, Route Des Lucioles, F-06921 Sophia-Antipolis Cedex France, No. Sitges, Spain, Dec. 9, 2019-Dec. 12, 2019, Dec. 2, 2019 (Dec. 2, 2019), XP051834167, 12 Pages, the whole document, p. 11.

* cited by examiner

Communication of post-PRS messages from responder UEs 950

GROUP-BASED POSITIONING DESIGN IN ASYNCHRONOUS VEHICULAR NETWORKS

RELATED APPLICATIONS

This application is a continuation of U.S. application Ser. No. 17/364,619, filed Jun. 30, 2021, entitled "GROUP-BASED POSITIONING DESIGN IN ASYNCHRONOUS VEHICULAR NETWORKS", which is assigned to the assignee hereof, and incorporated herein in its entirety by reference.

BACKGROUND

1. Field of Disclosure

The present disclosure relates generally to the field of wireless communication, and more specifically to determining the location of User Equipment (UE) using positioning reference signal (PRS).

2. Description of Related Art

Wireless communication systems or wireless networks are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via a downlink and uplink. The downlink (or forward link) refers to the communication link from the BS to the UE, and the uplink (or reverse link) refers to the communication link from the UE to the BS. A BS may be referred to as a Node B, a gNodeB (gNB), an access point (AP), a radio head, a transmit receive point (TRP), a New Radio (NR) BS, a 5G Node B, and/or the like.

BRIEF SUMMARY

In one aspect of the present disclosure, a method for positioning of an initiator user equipment (UE) is disclosed. In some embodiments, the method includes: sending, to a responder UE, a reference signal message; receiving, from the responder UE, a responding reference signal message corresponding to the responder UE; and based on the receiving of the responding reference signal message of the responder UE: sending, to the responder UE, a first message including at least an indication that the initiator UE receives the responding reference signal message from the responder UE; and receiving, from the responder UE, a second message including timing data related to the responding reference signal message of the responding UE, and a location of the responder UE correlated to the timing data.

In another aspect of the present disclosure, an initiator user equipment (UE) for wireless communication is disclosed. In some embodiments, the initiator UE includes: one or more transceivers; memory; and one or more processors communicatively coupled with the memory and the one or more transceivers, the one or more processors configured to: send, to a responder UE, a reference signal message; receive, from the responder UE, a responding reference signal message corresponding to the responder UE; and based on the receipt of the responding reference signal message of the responder UE: send, to the responder UE, a first message including at least an indication that the initiator UE receives the responding reference signal message from the responder UE; and receive, from the responder UE, a second message including timing data related to the responding reference signal message of the responder UE, and a location of the responder UE correlated to the timing data.

In another aspect of the present disclosure, a method for positioning of an initiator user equipment (UE), the method performed by a responder UE is disclosed. In some embodiments, the method includes: receiving, from the initiator UE, a first reference signal message; sending, to the initiator UE, a second reference signal message corresponding to the responder UE; and based on the sending of the second reference signal message: receiving, from the initiator UE, a third message including at least an indication that the initiator UE receives the second reference signal message; and sending, to the initiator UE, a fourth message including timing data related to the second reference signal message, and a location of the responder UE correlated to the timing data.

In another aspect of the present disclosure, a responder user equipment (UE) for wireless communication is disclosed. In some embodiments, the responder UE includes: a transceiver; memory; and one or more processors communicatively coupled with the memory and the transceiver, the one or more processors configured to: receive, from an initiator UE, a first reference signal message; send, to the initiator UE, a second reference signal message corresponding to the responder UE; and based on the sending of the second reference signal message: receive, from the initiator UE, a third message including at least an indication that the initiator UE receives the second reference signal message; and send, to the initiator UE, a fourth message including timing data related to the second reference signal message, and a location of the responder UE correlated to the timing data.

BRIEF DESCRIPTION OF THE DRAWINGS

Like reference symbols in the various drawings indicate like elements, in accordance with certain example implementations.

DETAILED DESCRIPTION

Figure 1:
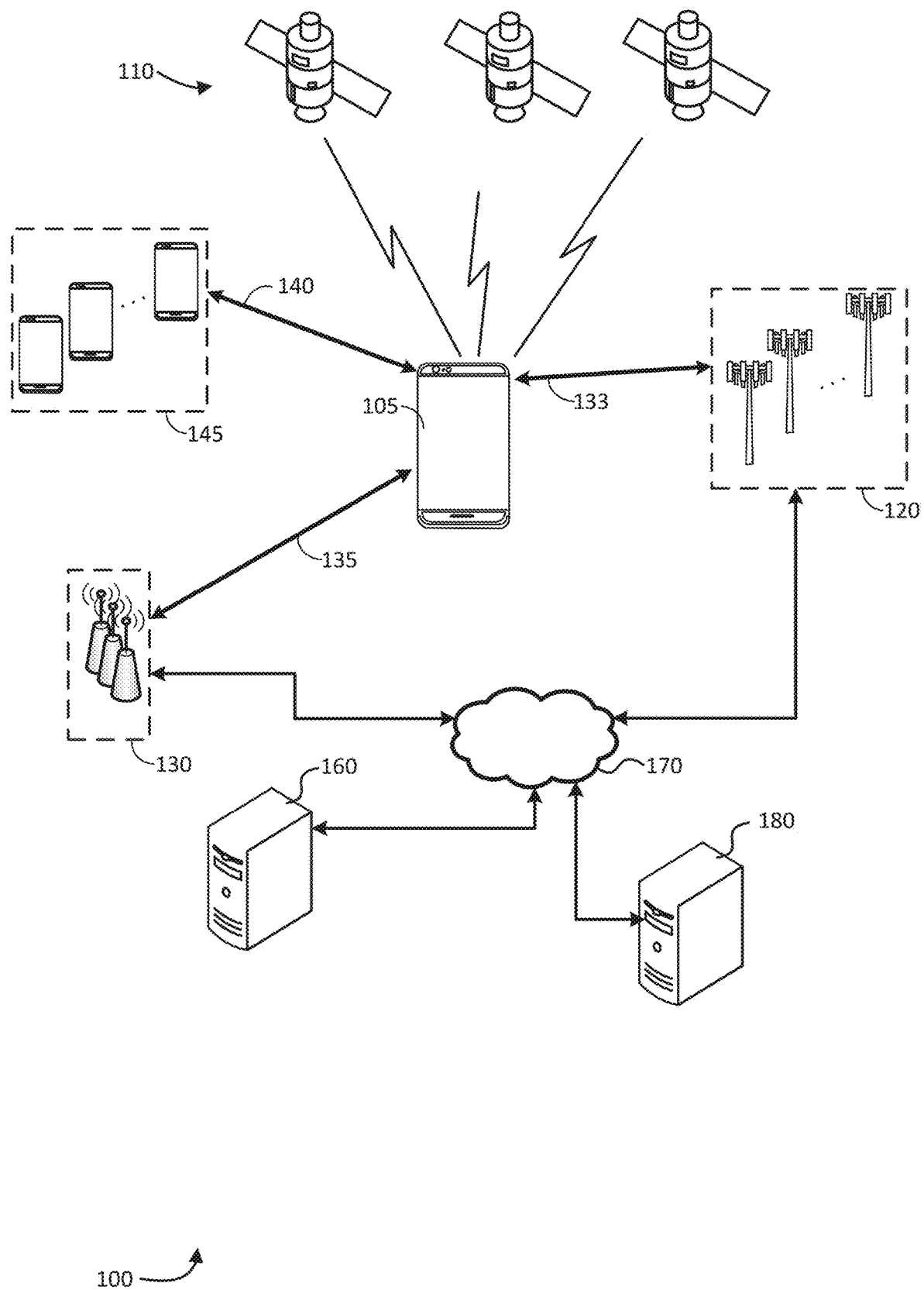
FIG. 1 is a diagram of a positioning system, according to an embodiment.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1x EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

In some aspects, a positioning reference signal (PRS) may be used to determine a position of a user equipment (UE). According to some positioning techniques, PRS may be exchanged between two UEs, the first UE may send its PRS to the second UE, and then the second UE may send its PRS to the first UE. The PRS exchange between the two UEs may happen within a certain time period so that clock drift error of the two UEs may be minimal. In some aspects, a PRS may be a pseudo-noise (PN) sequence. The PRS may be without a payload. The transmission duration of a PRS may be short (e.g., 33 microseconds). There may be a set of PN sequences generated and shared among the UEs in a network. A PRS may be identified by its identification (ID). For example, all the UEs in the network may share a mechanism to generate the PN sequence. The mechanism to generate the PN sequence may include a sequence generator that is configured to generate the PN sequences based on a seed. A UE may select a PN sequence from the generated PN sequences and may indicate to other UEs that it may use the selected PN sequence to communicate with the other UEs.

In some aspects, the UEs in a network may be configured to broadcast basic safety messages (BSM). The broadcast of the BSM may occur periodically. In some aspects, the BSM may include information that indicates whether a UE is capable of performing PRS-based positioning. The BSM may also include information related to an approximate position of a UE. A UE may be configured with a clock. In some aspects, timing between one UE with another UE may not be perfectly synchronized due to certain level of synchronization error which may be in the nanoseconds level.

An initiator UE may be the UE that initiates a positioning session. A responder UE may be the UE that responds or reacts to the initiator UE. In some aspects, an initiator UE may identify a plurality of responder UEs based at least in part on the information included in the BSMs of the responder UEs. For example, the initiator UE may select the plurality of responder UEs for a UE positioning session.

In some aspects, a group of UEs may participate in a positioning session. The group of UEs may include an initiator UE and multiple responder UEs. In some aspects, a communication between an initiator UE and each of the responder UE in the multiple responder UEs may include pre-PRS messages, PRS messages and post-PRS messages. The pre-PRS messages may be communicated during a pre-PRS stage, the PRS messages may be communicated during a PRS stage, and the post-PRS messages may be communicated during a post-PRS stage. A combination of a pre-PRS message, a PRS message, and a post-PRS message may be viewed as one unit of positioning signals communicated between an initiator UE and a responder UE. In some aspects, a positioning session may be performed over multiple units of positioning signals.

In some aspects, the PRS messages may be transmitted using a large bandwidth to improve ranging. Positioning accuracy may increase as the bandwidth used for the PRS messages increases. As such, the PRS messages may be transmitted using an unlicensed spectrum for larger bandwidth. For example, a licensed spectrum may be associated with frequencies used by the wireless communication network in accordance with governing communication standards (e.g., 4G, 5G, etc.), and an unlicensed spectrum may be associated with frequencies outside of the licensed spectrum and for which LBT communication protocols may apply. To transmit a PRS message using an unlicensed spectrum, a UE may need to perform a listen before talk (LBT) procedure to contend for access to the unlicensed electromagnet spectrum band (e.g., to determine whether a channel of the unlicensed electromagnetic spectrum band is available). In some aspects, the pre-PRS messages and the post-PRS messages may be transmitted using a licensed spectrum because it is an efficient means of communication between UEs in a wireless network. In some aspects, the disclosed positioning technique may be applicable in communication systems that implement the vehicle-to-everything (V2X) standard.

In some aspects, a positioning session may be initiated by an initiator UE based on the initiator UE determining that it is not certain about its location as related to a positioning system. For example, an initiator UE may determine that it is completely out of coverage with no network connectivity. In some aspects, when an initiator UE needs to determine its location, the initiator UE may select a group of responder UEs from a plurality of nearby UEs based on positioning properties of each of the responder UEs. In some aspects, the positioning properties of a responder UE may include one or more of a location of confidence of the responder UE, a direction that the responder UE may be moving, a velocity of the responder UE, and a position of the responder UE.

In some aspects, an initiator UE may select and engage in a positioning session with a responder UE based on the responder UE moving in a direction different from a direction that the initiator UE is moving. In some aspects, a responder UE may be selected based on the responder UE having a higher location confidence than the initiator UE. In some aspects, the initiator UE may select a responder UE that is moving in a substantially opposite direction over a responder UE that is moving in a substantially similar direction for a positioning session. This may be because there may not be much angular changes between the initiator UE and the responder UE when they are both moving in the same direction. Multiple angular changes between a position of the initiator UE and a position of a responder UE may help with the determination of the location of the initiator UE. In some aspects, communication between an initiator UE and a responder UE in a positioning session described herein may not include communication to a base station or to a server computing system.

In some aspects, an initiator UE and a responder UE may use each other to determine their locations. For example, during a positioning session, an initiator UE may send one set of timing data related to a departure time and an arrival time and a position of the initiator UE to a responder UE to enable the responder UE to determine its location. Similarly, the responder UE may send another set of timing data related to a departure time and an arrival time and a position of the responder UE to the initiator UE to enable the initiator UE to determine its location. In some aspects, the responder UE may be configured to send range information relative to the initiator UE to the initiator UE. In some aspects, the initiator UE may be configured to send range information relative to the responder UE to the responder UE. The range information may indicate an approximate distance between an initiator UE and a responder UE.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a UE 105, location server 160, and/or other components of the positioning system 100 can use the techniques provided herein for a group-based positioning design in asynchronous vehicular networks, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
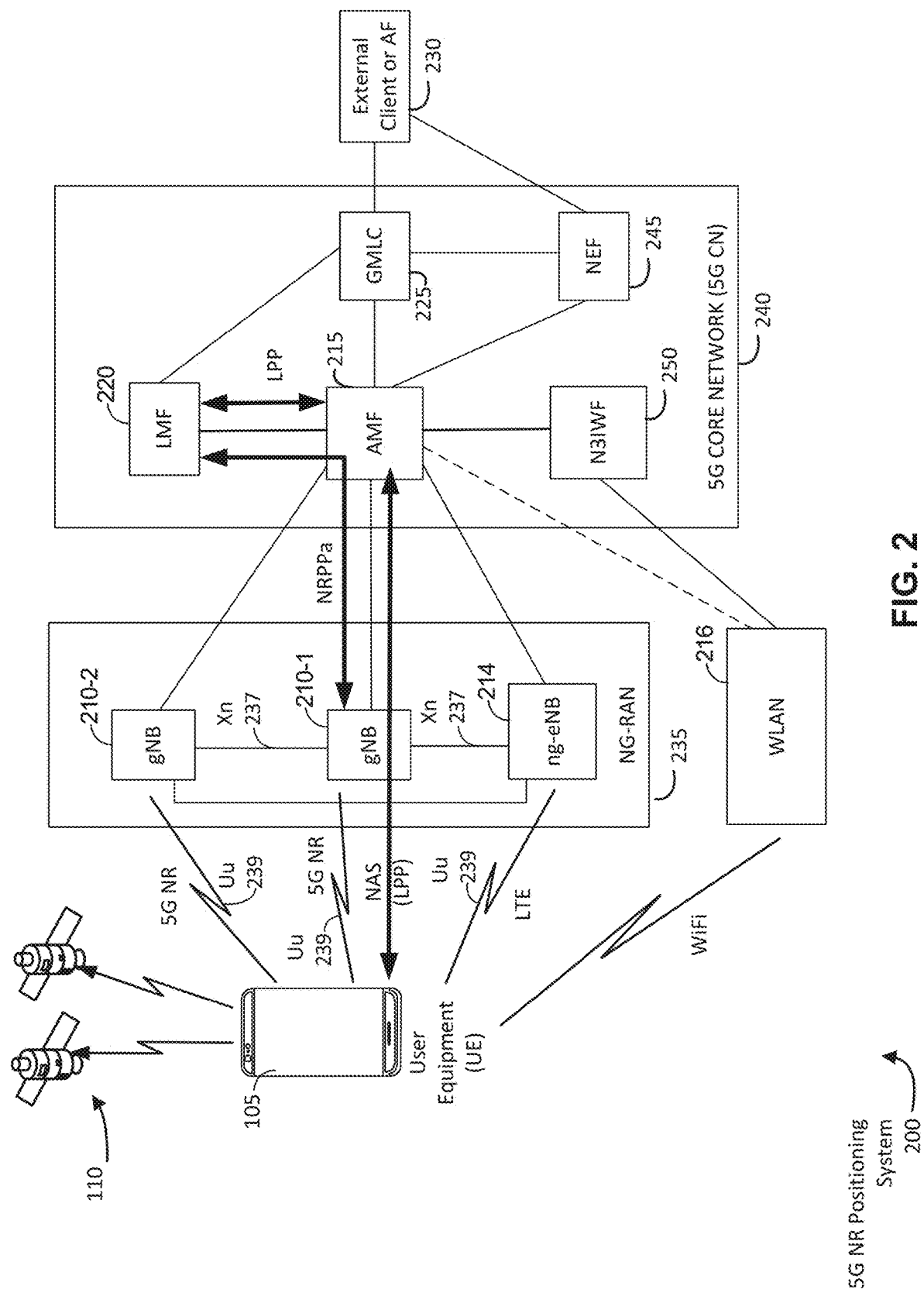
FIG. 2 is a diagram of a 5th Generation (5G) New Radio (NR) positioning system, illustrating an embodiment of a positioning system (e.g., the positioning system of FIG. 1) implemented within a 5G NR communication system, according to an embodiment.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNB s 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
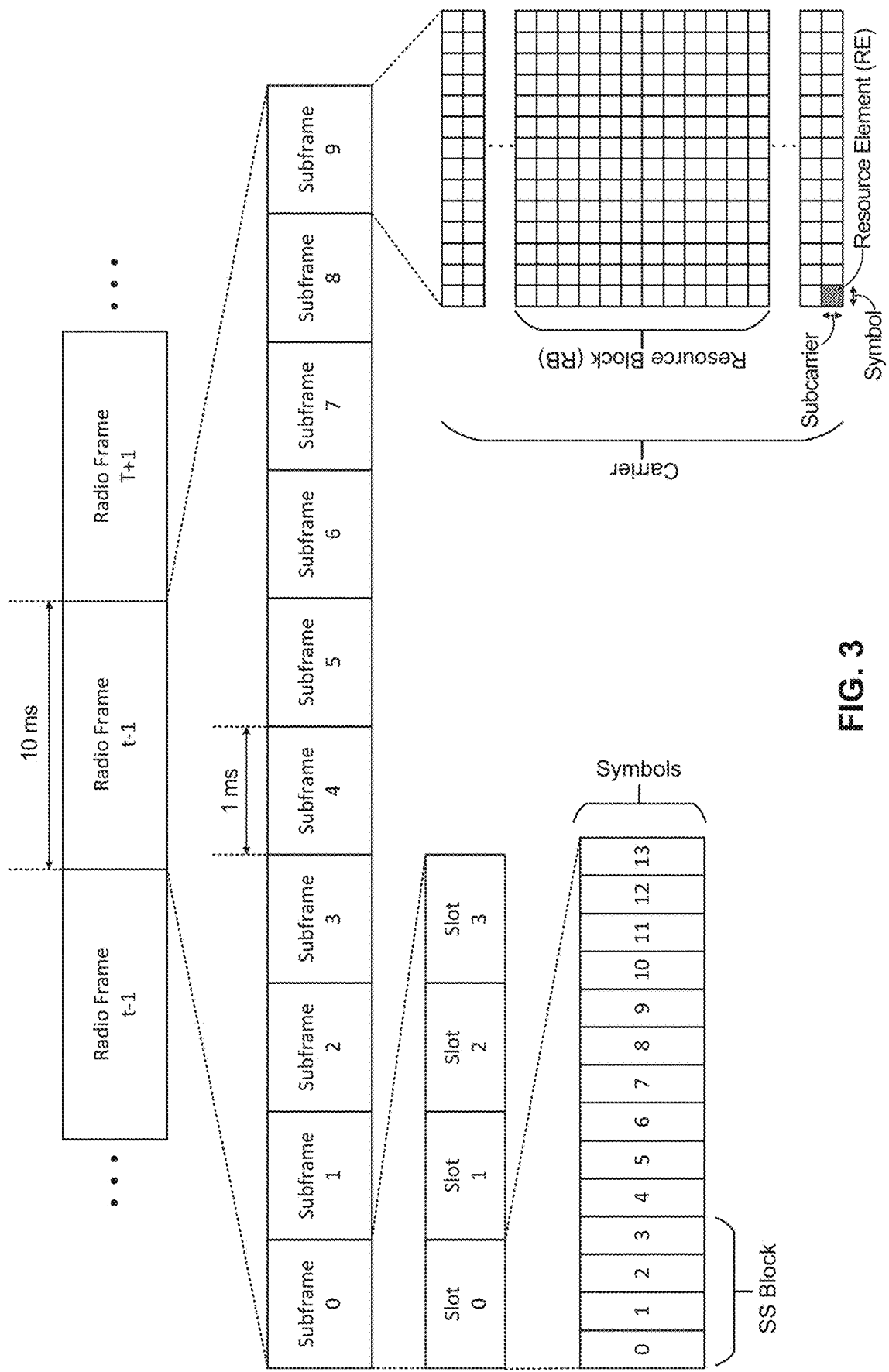
FIG. 3 is a diagram showing an example of a frame structure for NR and associated terminology, according to an embodiment.

FIG. 3 is a diagram showing an example of a frame structure for NR and associated terminology, which can serve as the basis for physical layer communication between the UE 105 and base stations, such as serving gNB 210-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 4:
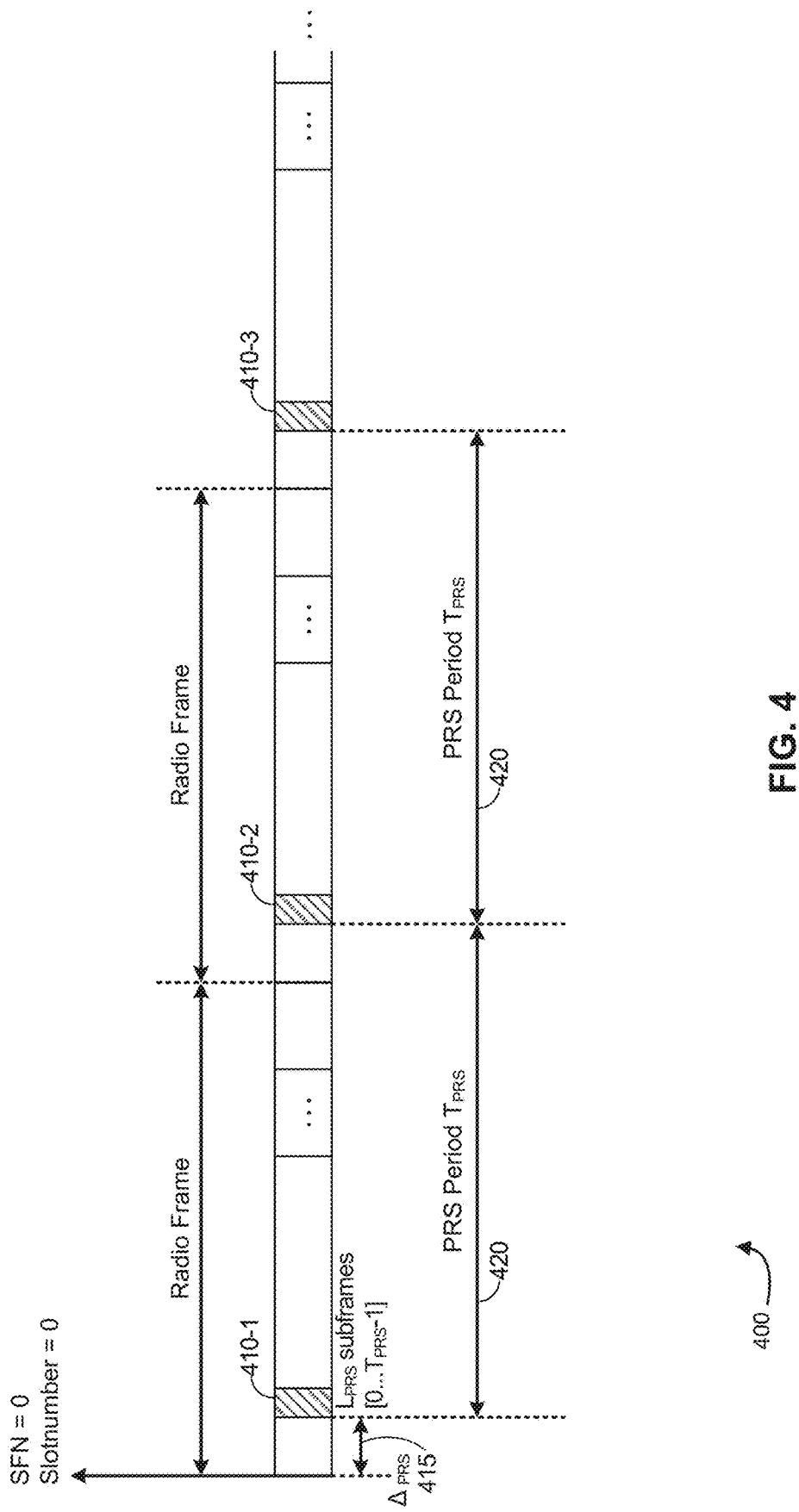
FIG. 4 is a diagram showing an example of a radio frame sequence with Positioning Reference Signal (PRS) positioning occasions, according to an embodiment.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," "a positioning repetition," or simply an "occasion," an "instance," or a "repetition." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 3, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset ($\Delta_{PRS}$) 415, a length or span of $L_{PRS}$ subframes, and the PRS Periodicity ($T_{PRS}$) 420. The cell-specific PRS subframe configuration may be defined by a "PRS Configuration Index," hRs, included in assistance data (e.g., TDOA assistance data), which may be defined by governing 3GPP standards. The cell-specific subframe offset (APRs) 415 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 410. For example, a PRS positioning occasion 410-1 can comprise a number $N_{PRS}$ of consecutive positioning subframes where the number $N_{PRS}$ may be between 1 and 160 (e.g., may include the values 1, 2, 4 and 6 as well as other values). PRS occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE 105 receives a PRS configuration index $I_{PRS}$ in the assistance data for a particular cell (e.g., base station), the UE 105 may determine the PRS periodicity $T_{PRS}$ 420 and cell-specific subframe offset ($\Delta_{PRS}$) 415 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 415) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 410 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Figure 5:
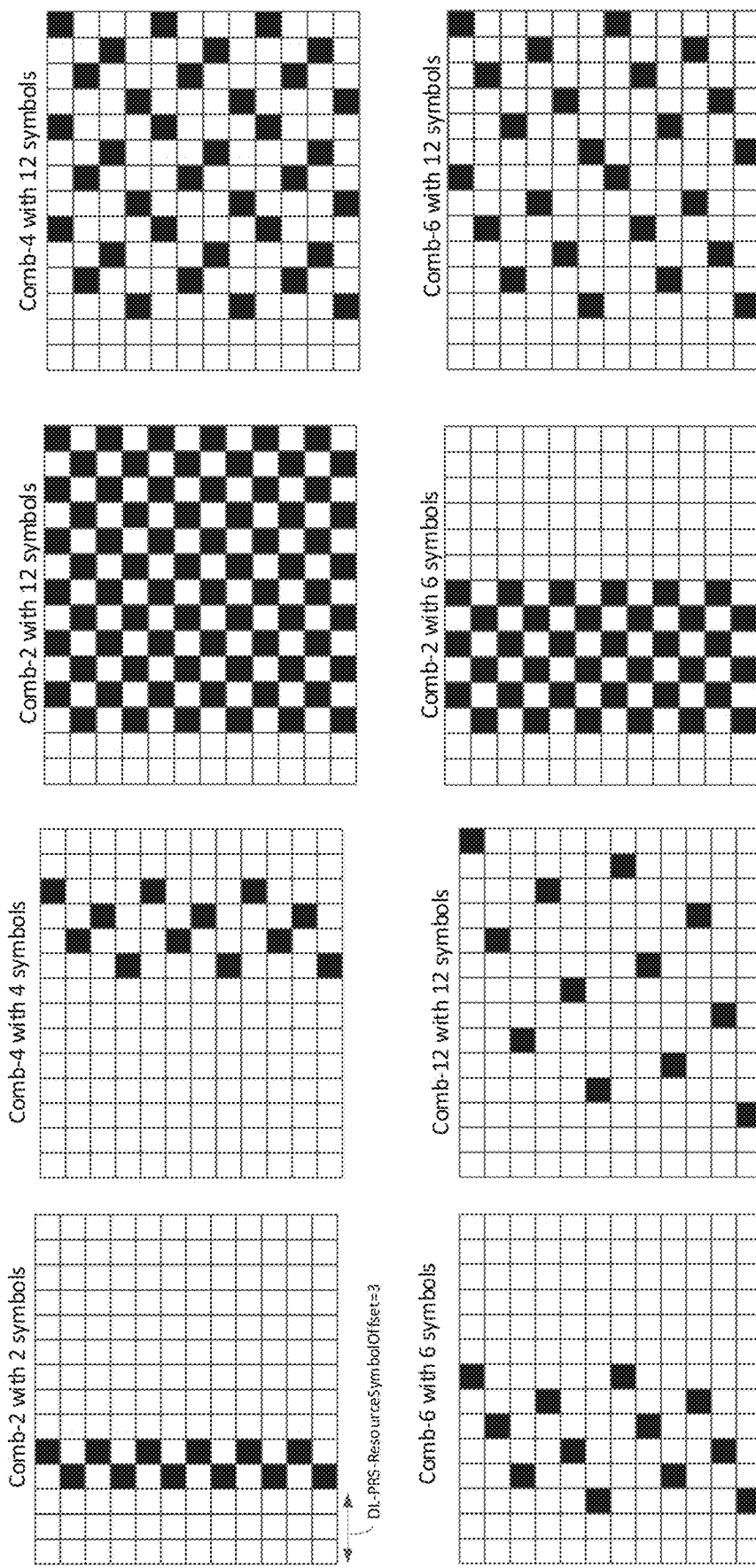
FIG. 5 is a diagram showing examples of different comb sizes using with different numbers of symbols, according to an embodiment.

With reference to the frame structure in FIG. 3, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

A "PRS resource set" is a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 6:
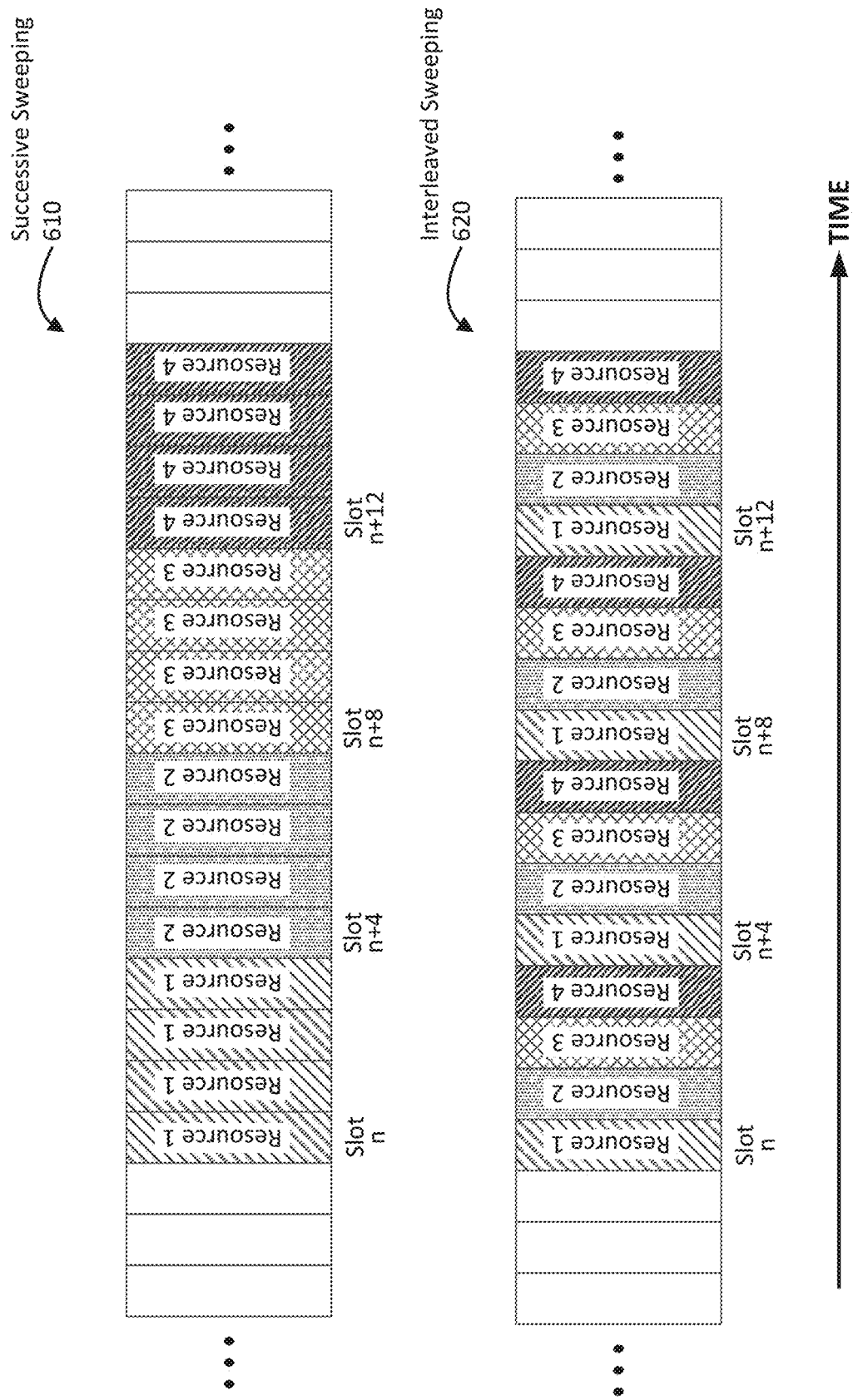
FIG. 6 is a timing diagram illustrating two different options for slot usage of a resource set, according to an embodiment.

FIG. 6 is a timing diagram illustrating two different options for slot usage of a resource set, according to an embodiment. Because each example repeats each resource four times, the resource set is said to have a repetition factor of four. Successive sweeping 610 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 620, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single FL, and a UE may be capable of taking measurements of PRS resources transmitted via multiple FLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol).

As noted, a UE may be configured to execute an MG pattern to measure and process PRS resources of a PRS resource set outside an active DL bandwidth part (BWP) via which the UE sends and receives data with a serving TRP. To allow the network to configure the UE in a manner that accommodates the processing and buffering capabilities of the UE (which may be dynamic), the UE may provide to the network (e.g., a TRP or location server) capabilities related to PRS processing. The various parameters of the MG pattern can be configured in view of these capabilities.

Although many of the communication structures and concepts provided in FIGS. 3-6 are used to provide positioning of UEs in the systems of FIGS. 1 and 2 based on uplink (UL) and/or downlink (DL) signals sent from and/or received by the UE and base stations, they can also be used to communicate PRS (and other reference signals) between UEs. As noted below with FIGS. 7A and 7B, FIGS. 8A and 8B and FIGS. 9A and 9B, the UEs may coordinate and execute positioning using pre-PRS, PRS, and post-PRS communications. It may be noted that the exchange of messages described with FIGS. 7A and 7B, FIGS. 8A and 8B and FIGS. 9A and 9B is for RTT-based positioning, where ranges between initiating and responding UEs are determined based on the time it takes for PRS messages to travel between devices.

Figure 7A:
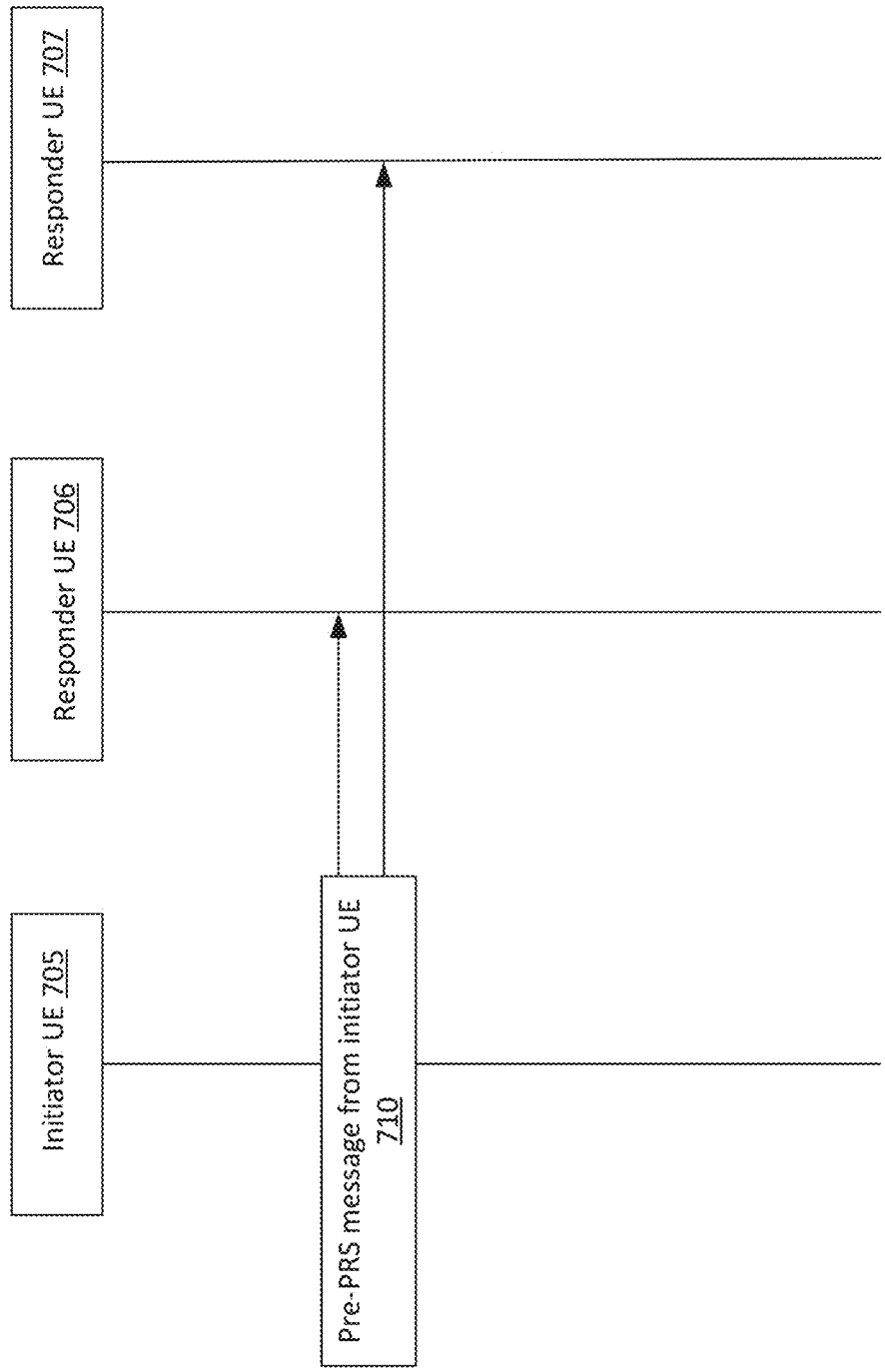
FIGS. 7A and 7B are timing diagrams illustrating an example of communication of pre-PRS messages that may occur during a pre-PRS stage, according to some aspects.
Figure 7B:
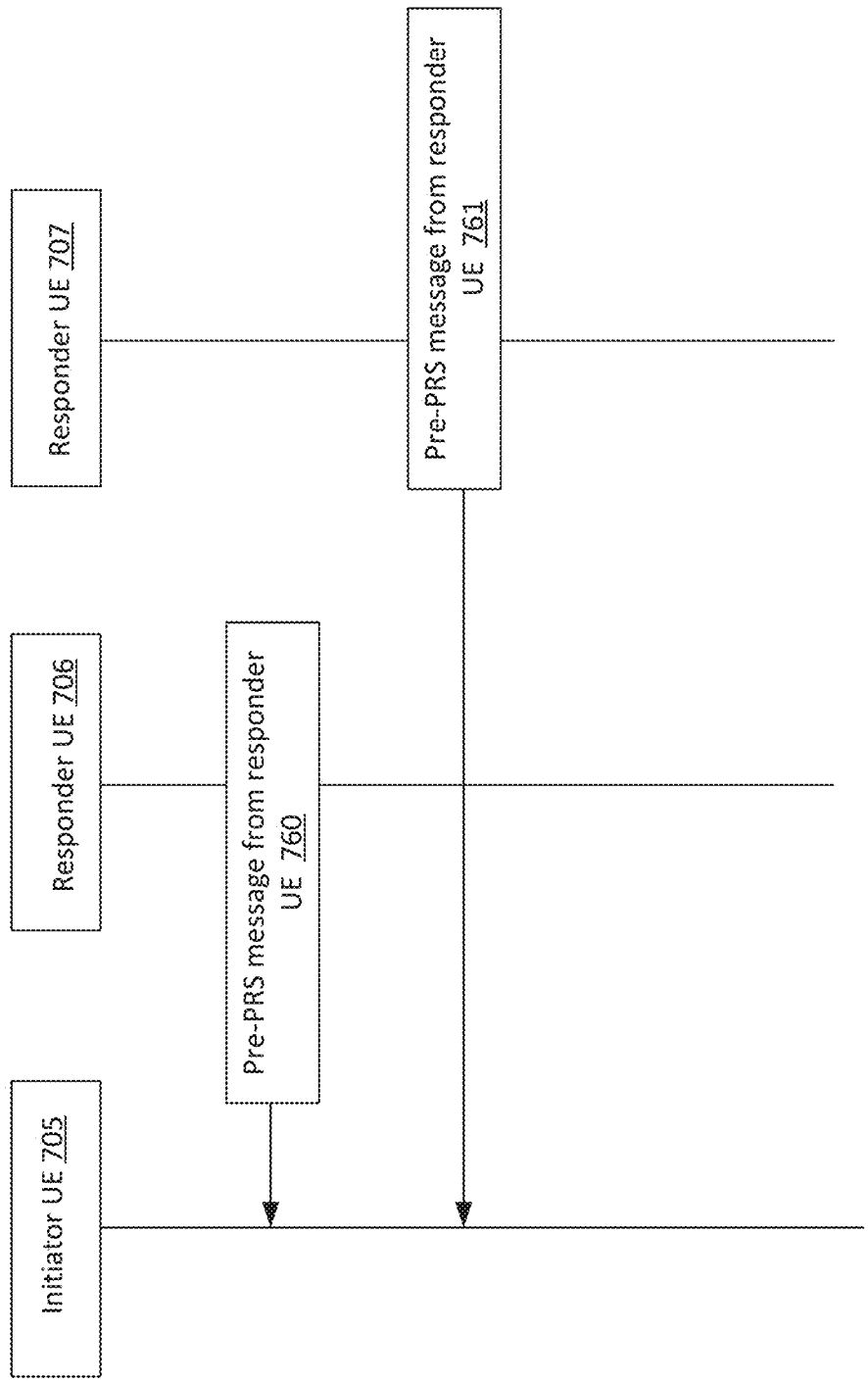

FIGS. 7A and 7B are timing diagrams illustrating an example of communication of pre-PRS messages that may occur during a pre-PRS stage, according to some aspects. The pre-PRS messages communicated by an initiator UE and responder UEs during the pre-PRS stage may be performed using a licensed spectrum. The initiator UE may correspond with UE 105 of FIGS. 1 and 2 (the position of which is to be determined), for example. The responder UEs may correspond with UEs 145 of FIG. 1 that are used to assist in the positioning of the initiator UE 105. In some aspects, an initiator UE may be configured to perform UE positioning sessions with multiple responder UEs to determine a position of the initiator UE with respect to the multiple responder UEs.

The communication example in timing diagrams 700 and 750 may include pre-PRS messages communicated between an initiator UE 705 and two responder UEs 706 and 707. The communication may be initiated by the initiator UE 705 and may be based on information included in one or more messages received from the responder UEs 706 and 707. In vehicular applications, for example, the initiator UE 705 may initiate communications with responder UEs 706 and 707 based on BSMs previously transmitted by the responder UEs 706 and 707 and received by the initiator UE 705. The initiator UE 705 may select the responder UEs 706 and 707 based on the positioning properties of the responder UEs 706 and 707. For example, the initiator UE may want to range with the responder UEs 706 and 707 because the responder UEs 706 and 707 know their locations better than the initiator UE knows its location (e.g., based on confidence metrics associated with the locations). The initiator UE 705 may notify the responder UEs 706 and 707 using the pre-PRS message 710.

In some aspects, the pre-PRS message 710 may include the PRS ID of the PRS that the initiator UE will use to communicate with the responder UEs 706 and 707, when the initiator UE 705 sends its PRS message, and the frequency information used by the initiator UE 705 to send its PRS message to each of the responder UEs 706 and 707.

In some aspects, the initiator UE 705 may be configured to determine, for each of the responder UEs 706 and 707, when they send their pre-PRS messages 760 and 761 to the initiator UE 705. The initiator UE 705 may be configured to determine, for each of the responder UEs 706 and 707, the PRS ID that each of the responder UEs 706 and 707 will use to communicate its PRS with the initiator UE 705, and when each of the responder UEs 706 and 707 can send its PRS message to the initiator UE 705.

In some aspects, the information that the initiator UE 705 determines for each of the responder UEs 706 and 707 may be included in the pre-PRS message 710. In some aspects, the initiator UE 705 may be configured to broadcast the pre-PRS message 710 with the same payload to the responder UEs 706 and 707. Each of the responder UEs 706 and 707 may need to evaluate the pre-PRS message 710 to determine the information that each can use to communicate with the initiator UE 705.

In some aspects, when the PRS ID of the initiator UE 705 is fixed over multiple PRS exchanges, the initiator UE 705 may transmit a timing ID associated with the current PRS exchange (or cycle) for each of the multiple PRS exchanges. Information about the cycle is noted below. In some aspects, the timing information when the initiator UE 705 transmits its PRS message may include a time determined by the initiator UE 705. Optionally, the timing information when the initiator UE 705 transmits its PRS message may include a time determined at upper layer such as, for example, an application layer. In some aspects, the timing information when the initiator UE 705 transmits its PRS message may include information about a time slot number nearest to the time determined by the initiator UE 705 when to transmit its PRS message. In some aspects, the time slot may be subjected to a local clock error. In some aspects, the local clock error may be addressed by reducing the time delays between the exchange of PRS messages between the initiator UE 705 and a responder UE. For example, the exchange of the PRS messages between the initiator UE 705 and the responder UE 706 may need to happen within a certain time so that the clock drift error of the initiator UE 705 and the responder UE 706 may be minimized. In some aspects, the local clock error may be addressed by accounting for some clock error in the timing of the PRS message sent by a responder UE. For example, the initiator UE 705 may be configured to allow for some additional time between slots of the responder UEs 706 and 707 to be sure signals are distinguishable, accounting for clock error.

In some aspects, the frequency information used by the initiator UE 705 to transmit the PRS message may include a frequency selected from an available set of total bandwidth. In some aspects, the frequency information may include a frequency selected by sensing an interference and selecting one or more channels associated with an average reference signal received power (RSRP) interference being less than a threshold. In some aspects, the initiator UE 705 may determine the bandwidth used by the responder UEs 706 and 707 to send their PRS message.

In some aspects, in addition to or instead of broadcasting the pre-PRS message 710 to the responder UEs 706 and 707, the initiator UE 705 may be configured to unicast distinct pre-PRS messages to each of the responder UEs 706 and 707. The payload of each of these distinct pre-PRS messages may be different from one another. The initiator UE 705 may unicast the distinct pre-PRS messages with RRC connection.

Based on each of the responder UEs 706 and 707 having received the pre-PRS message 710 from the initiator UE 705, each the responder UEs 706 and 707 may send its pre-PRS message 760 or 761 to the initiator UE 705 at the time determined by the initiator UE 705 and specified in the pre-PRS message 710. In some aspects, each of the responder UEs 706 and 707 may broadcast its pre-PRS message 760 or 761.

Each of the responder UEs 706 and 707 may be configured to confirm to the initiator UE 705, using the pre-PRS messages 760 or 761, the PRS ID of the PRS that each will send to the initiator UE 705. In some aspects, each of the responder UEs 706 and 707 may be configured to determine when each will send its PRS message to the initiator UE 705. In some aspects, the timing information about when each of the responder UEs 706 and 707 send its PRS message to the initiator UE 705 may be based on the timing information when the initiator UE 705 sends its PRS message (provided by the initiator UE 705 in the pre-PRS message 710) and an alpha value. The alpha value may be a number associated with hardware constraints and an interference level. The alpha value may be low when a PRS processing time is small and an ambient temperature is low. The alpha value may be high when the PRS processing time is high and the ambient interference is high. In some aspects, the timing information when each the responder UEs 706 and 707 sends its PRS message may include information about a time slot number that is closest to the time determined by the responder UE 706 or 707 when to transmit its PRS message. The time determined by the responder UE 706 or 707 when to transmit its PRS message may be subjected to a local clock error.

In some aspects, when a fixed PRS ID is used by the initiator UE 705 over multiple PRS exchanges for each of the responder UEs 706 and 707, the responder UEs 706 and 707 may use the fixed PRS ID determined by the initiator UE 705 as its PRS ID for the PRS exchange. In some aspects, each of the responder UEs 706 and 707 may indicate in the pre-PRS messages 760 and 761 the frequency that each will use to send its PRS message to the initiator UE 705. In some aspects, the frequency information used by the responder UE 706 or 707 to send its PRS message may include a frequency selected from an available set of total bandwidth. In some aspects, the frequency information may include a frequency selected by sensing an interference and selecting one or more channels associated with an average reference signal received power (RSRP) interference being less than a threshold.

Figure 8A:
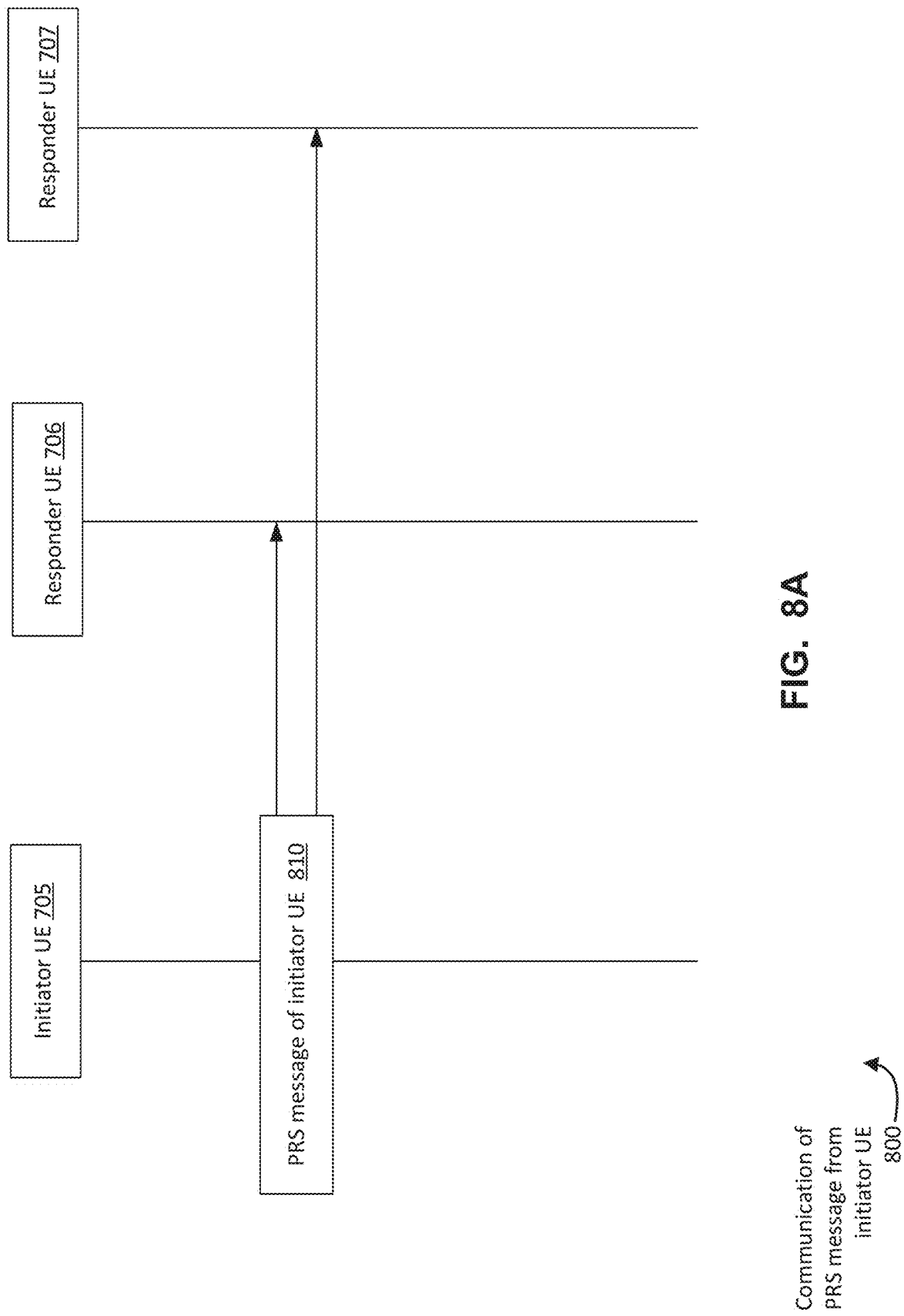
FIGS. 8A and 8B are timing diagrams illustrating an example of communication of PRS messages that may occur during a PRS stage, according to some aspects.
Figure 8B:
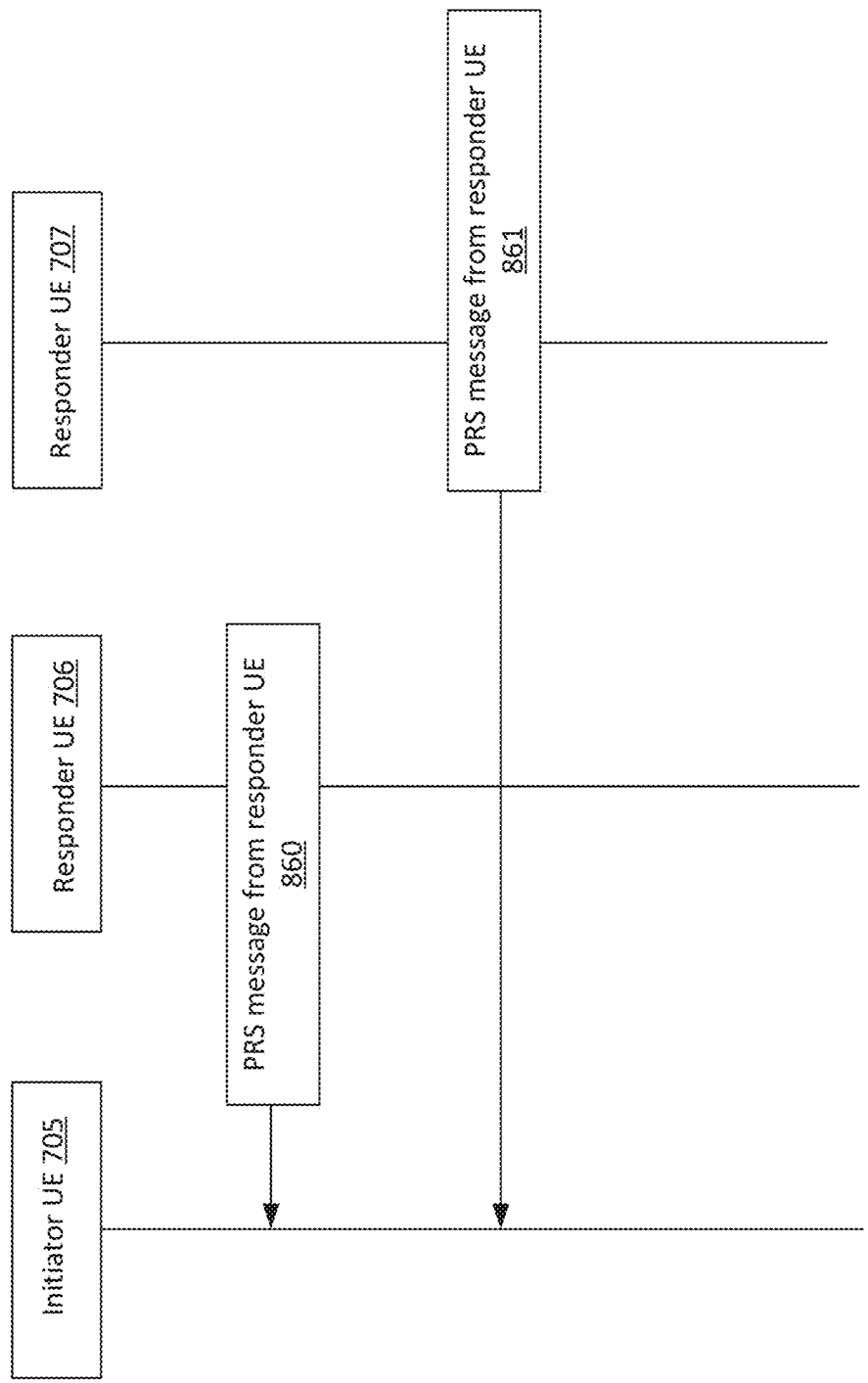

FIGS. 8A and 8B are timing diagrams illustrating an example of communication that may occur during a PRS stage, according to some embodiments. The communication example in timing diagrams 800 and 850 may include PRS messages communicated between an initiator UE 705 and two responder UEs 706 and 707. In some aspects, the PRS messages communicated during the PRS stage may be performed using unlicensed spectrum and may be subjected to LBT. Using the unlicensed spectrum may enable a UE to have access to more bandwidth which may help improving positioning accuracy.

Based on the initiator UE 705 having received the pre-PRS messages 760 and 761 from responder UEs 706 and 707, the initiator UE 705 and the responder UEs 706 and 707 are aware of the expected timing of the PRS message from one another, the PRS ID used by each, and any ID associated with the current PRS exchange.

In some aspects, the initiator UE 705 may be configured to broadcast the PRS message 810 to the responder UEs 706 and 707 based on the timing information included in its pre-PRS message 710 (shown in FIG. 7A). The PRS message 810 may be used by the initiator UE 705 to send its PRS to the responders UE 706 and 707. In some aspects, the PRS may be sent by the initiator UE 705 using the comb structure described with FIG. 5. In some aspects, the PRS may be sent by the initiator UE 705 using transmission techniques described with FIGS. 3 to 6.

The initiator UE 705 may use the PRS ID and the frequency information included in its pre-PRS message 710 to send the PRS message 810 to the responder UEs 706 and 707.

Optionally, the initiator UE 705 may broadcast the PRS message 810 based on the timing information included in its pre-PRS message 710 with a random waiting time due to LBT constraints associated with using an unlicensed spectrum. In some aspects, the LBT may be performed as Category 2 (CAT 2) LBT with fixed window Clear Channel Assessment (CCA). In some aspects, the LBP may be performed as CAT 4 LBT with varying window CCA.

In some aspects, the initiator UE 705 may be configured to store the time instances (e.g., departure time) when its PRS message 810 is transmitted to the responder UEs 706 and 707. In some aspects, the time instances may be subjected to local clock error. In some aspects, each of the responder UEs 706 and 707 may be configured to store the time instances (e.g., arrival time) when it receives the PRS message 810 from the initiator UE 705. In some aspects, the time instances may be subjected to local clock error.

Based on the responder UEs 706 and 707 having received the PRS message 810 from the initiator UE 705, each of the responder UEs 706 and 707 may be configured to broadcast its PRS message 860 or 861 to the initiator UE 705 based on the timing information included in its pre-PRS messages 760 and 761 (shown in FIG. 7B). The PRS messages 860 and 861 may be used by the responder UEs 706 and 707 to send their PRS to the initiator UE 705.

In some aspects, each of the responder UEs 706 and 707 may be configured to store the time instances (e.g., departure time) when its PRS message 860 or 861 is sent to the initiator UE 705. In some aspects, the time instances may be subjected to local clock error.

Optionally, each of the responder UEs 706 and 707 may broadcast their PRS messages 860 and 861 based on the timing information included in their pre-PRS messages 760 and 761 with a random waiting time due to LBT constraints associated with using an unlicensed spectrum. In some aspects, the LBT may be performed as CAT 2 LBT with fixed window CCA. In some aspects, the LBP may be performed as CAT 4 LBT with varying window CCA.

In some aspects, the initiator UE 705 may be configured to store the time instances (e.g., arrival time) when it receives the PRS messages 860 and 861 from the responder UEs 706 and 707. In some aspects, the time instances may be subjected to local clock error. In some aspects, it may be possible that the initiator UE 705 does not receive the PRS message 860, the PRS message 861, or both, from the responder UEs 706 and 707. When this occurs, the initiator 705 may indicate this to the respective responder UE 706 and/or 707, as noted below.

Figure 9A:
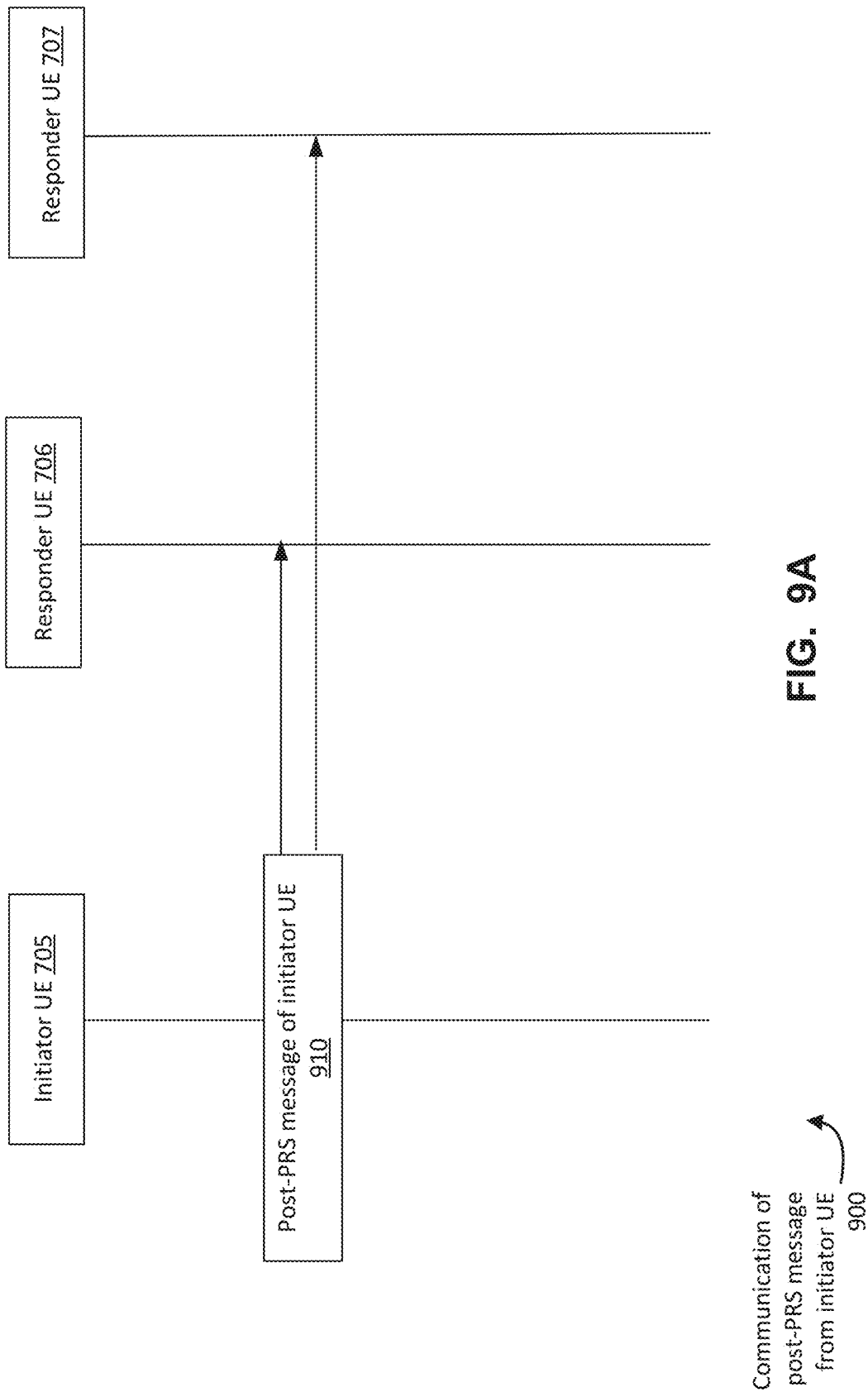
FIGS. 9A and 9B are timing diagrams illustrating an example of communication of post-PRS messages that may occur during a post-PRS stage, according to an embodiment.
Figure 9B:
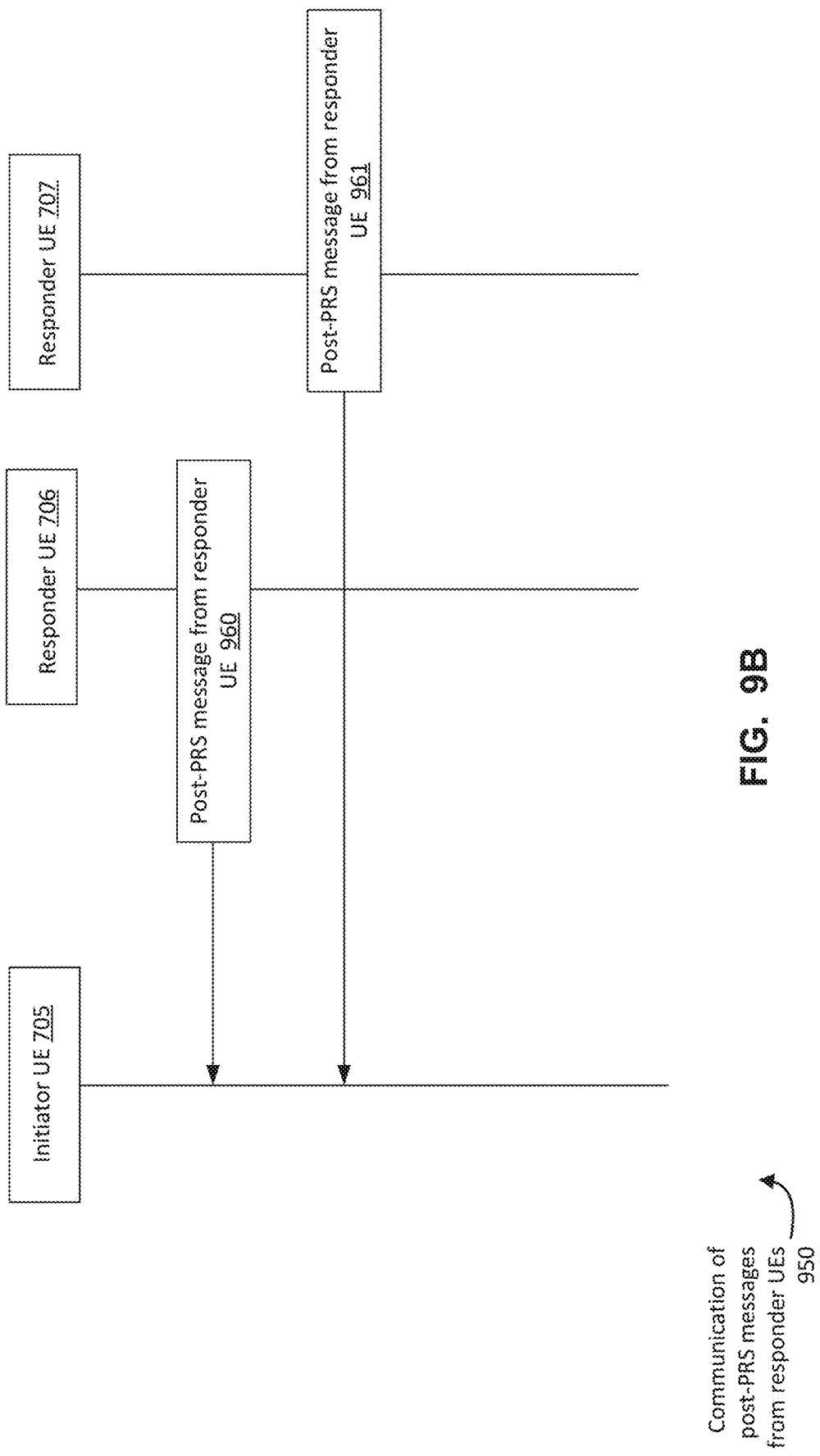

FIGS. 9A and 9B are timing diagrams illustrating an example of communication that may occur during a post-PRS stage, according to some embodiments. The communication example in timing diagrams 900 and 950 may include post-PRS messages communicated between an initiator UE 705 and two responder UEs 706 and 707. In some aspects, the post-PRS messages communicated during the post-PRS stage may be performed using a licensed spectrum. Based on the initiator UE 705 having received the PRS messages 860 and 861 from responder UEs 706 and 707, the initiator UE 705 may be configured to send the post-PRS message 910 to the responder UEs 706 and 707 using either broadcast or unicast similar to when the initiator UE sends its pre-PRS message 710 (shown in FIG. 7A). The post-PRS message 910 may be used by the initiator UE 705 to indicate whether the initiator UE 705 receives the PRS messages 860 and 861 from the responder UEs 706 and 707.

In some aspects, based on the initiator UE 705 having received the PRS messages 860 and 861, the initiator UE 705 may be configured to determine the departure time of PRS message 810 and the arrival time of PRS messages 860 and 861 (shown in FIG. 8B). In some aspects, the arrival time of the PRS messages 860 and 861 may be determined as a relative time with respect to the departure time of the PRS message 810. In some aspects, the relative time may be approximated to a closest multiple of time scale shared by the initiator UE 701 and the responder UEs 706 and 707. It may be noted that when the initiator UE 705 does not receive the PRS message 860, the PRS message 861, or both, the post-PRS message 910 may indicate that one or more of the PRS messages 860 and 861 is not received. In those situations, the departure time of the PRS message 860 or 861 of the responder UE 706 or 707 may be updated (as noted below). In some aspects, the payload for the post-PRS message 910 may be the same for the responder UEs 706 and 707 (as shown in FIG. 9A).

Based on receiving the post-PRS message 910 from the initiator UE 705, each of the responder UEs 706 and 707 may be configured to transmit its post-PRS message 960 or 961 (shown in FIG. 9B) to the initiator UE 705. The responder UE 706 may use the post-PRS message 960 to indicate whether it received the PRS message 810 from the initiator UE 705, the departure time of the PRS message 860 of responder UE 706, the arrival time of the PRS message 810 of the initiator UE 705, and the location of responder UE 706 at the departure time of the PRS message 860. Similarly, the responder UE 707 may use the post-PRS message 961 to indicate whether it receives the PRS message 810 from the initiator UE 705, the departure time of the PRS message 861 of responder UE 707, the arrival time of the PRS message 810 of the initiator UE 705, and the location of responder UE 707 at the departure time of the PRS message 861.

In some aspects, the departure time of the PRS messages 860 and 861 of the responder UEs 706 and 707 may be determined as a relative time with respect to the arrival time of the PRS message 810 of the initiator UE 705. In some aspects, the relative time may be approximated to the closest multiple of time scale shared by the initiator UE 705 and the responder UEs 706 and 707. In some aspects, when the post-PRS message 910 indicates that the initiator UE 705 did not receive the PRS message 860 from the responder UE 706 or the PRS message 861 from the responder UE 707, the departure time of the PRS message of the responder UE 706 or 707 in the post-PRS message 960 or 961 may be given a "null" value.

In some aspects, the communication shown in FIG. 7A, 7B, 8A, 8B, 9A and 9B between the initiator UE 705 and the responder UEs 706 and 707 during the pre-PRS stage, the PRS stage and the post-PRS stage may be repeated in multiple iterations or cycles. In some aspects, a cycle value may be determined by the initiator UE 705, and a cycle counter may be maintained by the initiator UE 705. In some aspects, the cycle value may be determined by an upper layer such as, for example, an application layer. In some aspects, the cycle value may be determined based on velocities of the initiator UE and the responder UEs and angular changes between the initiator UE and the responder UEs. For example, when the initiator UE 705 and the responder UEs 706 and 707 are moving in the same direction, the angular changes may be minimal, and therefore it may not be useful to have a high number of cycles or iteration. However, when the responder UEs 706 and 707 are moving in directions away from the initiator UE 705, multiple geometries and angular changes may result between a position of the initiator UE 705 and positions of the responder UEs 706 and 707. As the separation in distances between the initiator UE 705 and the responder UEs 706 and 707 increases, the timing data (e.g., departure time of one reference signal and arrival time of another reference signal) associated with the responder UEs 706 and 707 and the positions of the responder UEs 706 and 707 may be different at time "t1" as compared to the same data at time "t2" and "t3". In this scenario, it may be useful for the initiator UE 705 to determine its location using a high number of cycles.

The cycle value may be transmitted by the initiator UE 705 to the responder UEs 706 and 707 using its pre-PRS message 710 (shown in FIG. 7). The cycle value may be confirmed by the responder UEs 706 and 707 using its pre-PRS message 760 and 761. In some aspects, the number of cycles may enable the initiator UE 705 to determine its position at different times based on different positions of the responder UEs 706 and 707.

At the end of each cycle, the cycle counter may be incremented by the initiator UE 705 based on successful receipt of the post-PRS messages 960 and 961 from the responder UEs 706 and 707. The initiator UE 705 may then determine its location. In some aspects, the determination of the location of the initiator UE 705 may be performed based at least in part on the departure time of the post-PRS message 910 and the arrival time of the post-PRS messages 960 and 961 and the location of the responder UEs 706 and 707 at the departure time of the PRS messages 860 and 861 using any currently available techniques including, for example, using the Kalman filter. The cycle of pre-PRS message, PRS message and post-PRS message may continue with the next cycle. In some aspects, the initiator UE 705 may determine when to start the next cycle. In some aspects, the start of the next cycle may be determined by an upper layer. When the cycle counter reaches or exceeds the cycle value and after receiving the post-PRS messages 960 and 961 from the responder UEs 706 and 707, the positioning session between the initiator UE 705 and the responder UEs 706 and 707 may end.

It may be noted that, even though the timing diagram examples shown in FIGS. 7A, 7B, 8A, 8B, 9A and 9B include only two responder UEs, the initiator UE 705 may initiate multiple positioning sessions with more than two responder UEs.

Figure 10:
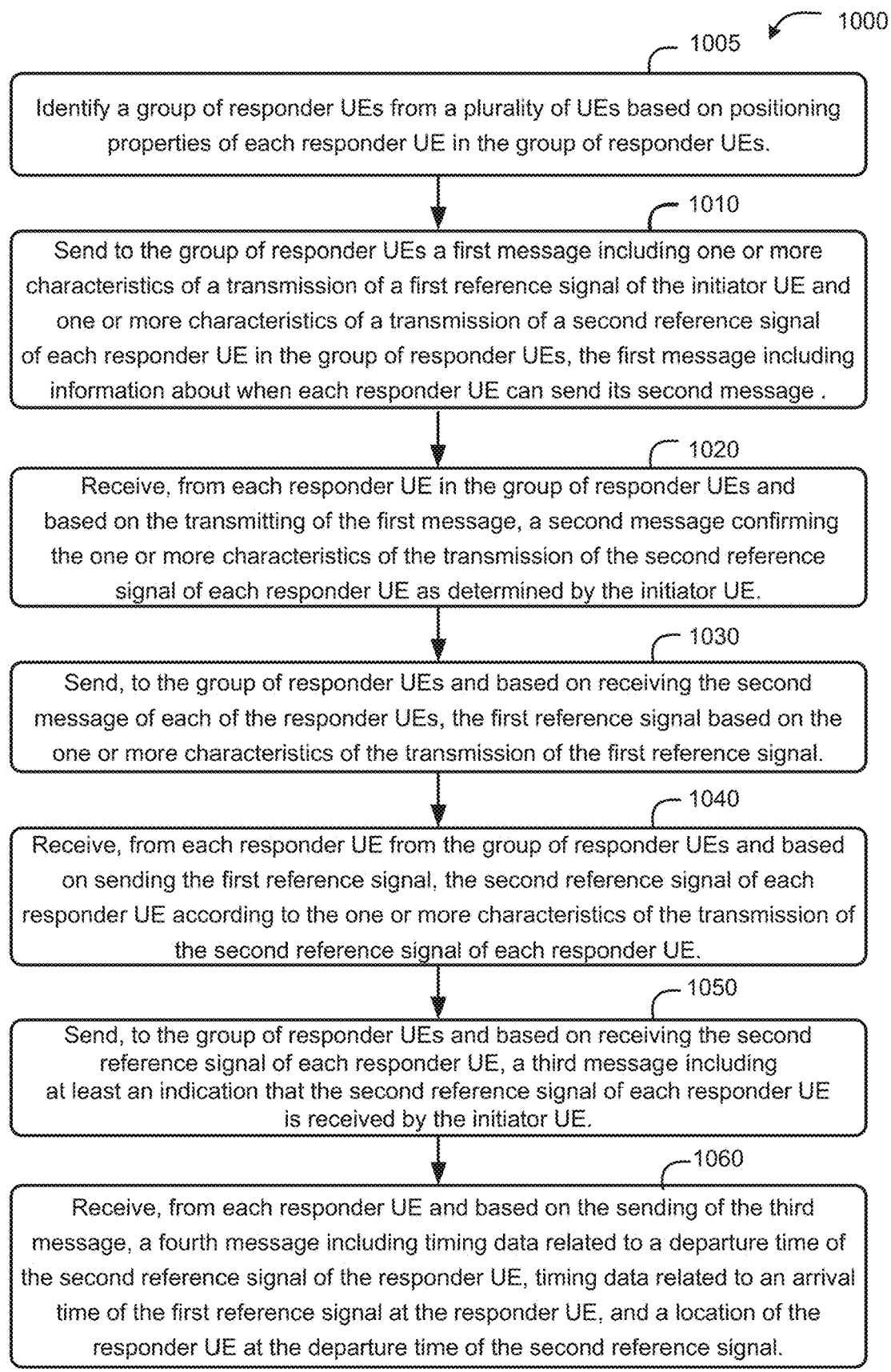
FIG. 10 is a flow diagram of an example process that may be performed by an initiator UE that initiates a positioning session, according to an embodiment
Figure 12:
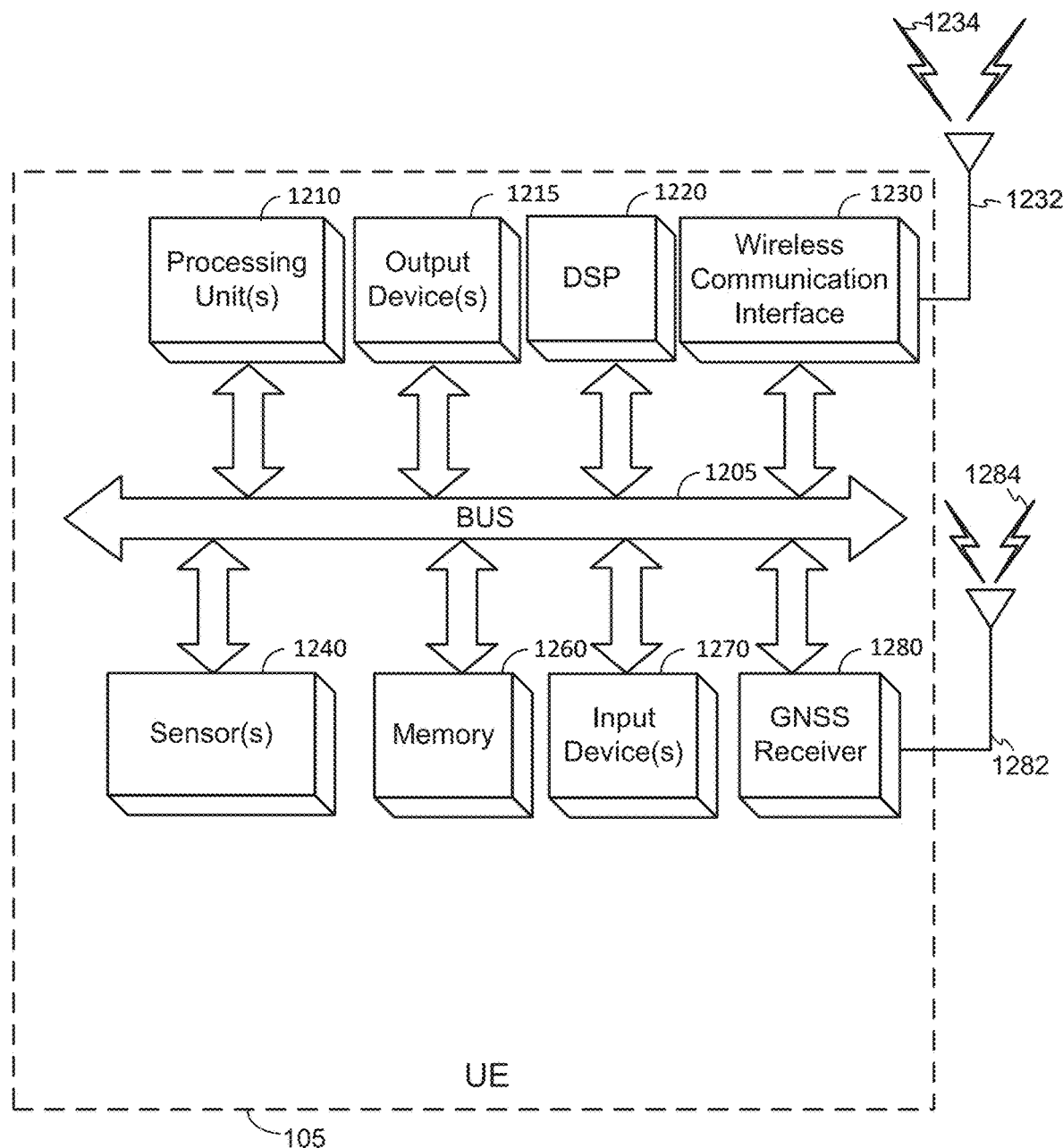
FIG. 12 is a block diagram of an embodiment of a UE, which can be utilized in embodiments as described herein.

FIG. 10 is a flow diagram of an example process that may be performed by a UE that initiates a positioning session, according to an embodiment. An initiator UE may correspond to a UE that initiates the positioning session. A group of responder UEs may correspond to the UEs that respond to the initiator UE. A first message may correspond to a pre-PRS message from the initiator UE. A second message from each of the responder UEs may correspond to a pre-PRS message from each of the responder UEs. A third message may correspond to a post-PRS message from the initiator UE. A fourth message from each of the responder UEs may correspond to a post-PRS message from each of the responder UEs. Means for performing the functionality illustrated in one or more of the blocks shown in FIG. 10 may be performed by hardware and/or software components of a UE. Example components of a UE are illustrated in FIG. 12 which are described in more detail below.

The operations may be performed by an initiator UE. At block 1005, the functionality comprises identifying a group of responder UEs from a plurality of UEs based on positioning properties of each responder UE. Each responder UE may be positioned near a position of the initiator UE. Each responder UE may be identified based on its positioning properties. The positioning properties may include a direction that the responder UE is moving, its velocity, its location confidence and its location. In some aspects, the positioning properties may be received from the BSM of the responder UE. For example, a responder UE may be identified because it is moving in a different direction as the initiator UE. Means for performing functionality at block 1005 may comprise the memory 1260, the processing unit(s) 1210, the wireless communication interface 1230, the antenna 1232, and/or other components of a UE, as illustrated in FIG. 12.

At block 1010, the functionality comprises sending, by the initiator UE to the group of responder UEs, its pre-PRS message (also referred to as a first message) which may include one or more characteristics of a transmission of a first reference signal of the initiator UE. The one or more characteristics of the transmission of the first reference signal may include a PRS ID of the first reference signal, timing data indicating a time when the initiator UE sends the first reference signal to the group of responder UEs and frequency data indicating a frequency used by the initiator UE to send the first reference signal to the group of responder UEs.

In some aspects, the initiator UE may determine on behalf of each responder UE and may include in the first message the following information: when each responder UE can send its pre-PRS message (also referred to as a second message) to the initiator UE, the PRS ID of a reference signal (also referred to as a second reference signal) that each responder UE may use to communicate with the initiator UE, and when each responder UE may send its second reference signal to the initiator UE.

In some aspects, the first message may further include one or more characteristics of a transmission of a second reference signal of each responder UE. The one or more characteristics of a transmission of a second reference signal of each responder UE may be determined by the initiator UE and may include PRS ID of a second reference signal that each responder UE may use to communicate with the initiator UE, and information about when a responder UE may send its second reference signal to the initiator UE. It may be noted that the PRS ID used by a responder UE may be distinct from the PRS IDs used by the other responder UEs and the PRS ID used by the initiator UE. It may also be noted that the first message from the initiator UE may be broadcast to all responder UEs using the same payload. The transmission described in block 1010 may be performed using a licensed spectrum. The transmission may be a broadcast. Means for performing functionality at block 1010 may comprise the memory 1260, the processing unit(s) 1210, the wireless communication interface 1230, the antenna 1232, and/or other components of a UE, as illustrated in FIG. 12.

At block 1020, the functionality comprises receiving, from each responder UE and based on the sending of the first message, a second message confirming that the appropriate responder UE has received the first message from the initiator UE. In some aspects, the second message from each responder UE may be broadcast at a time that is specified by the initiator UE in the first message. The second message from each responder UE may confirm the one or more characteristics of a transmission of a second reference signal of the responder UE as determined by the initiator UE on behalf of the responder UE. The second message from each responder UE may include data indicating a frequency used by the responder UE to send its second reference signal to the initiator UE. It may be noted that each responder UE may individually send its second message to the initiator UE (as shown in FIG. 7B). Means for performing the functionality at block 1020 may comprise processing unit(s) 1210, wireless communication interface 1230, antenna 1232, and/or other components of a UE, as illustrated in FIG. 12.

At block 1030, the functionality comprises sending, to the group of responder UEs and based on receiving the second message from each of the responder UEs, the first reference signal based on the one or more characteristics of the transmission of the first reference signal (as shown in FIG. 8A). The transmission of the first reference signal to the group of responder UEs may be performed using an unlicensed spectrum and may be subjected to LBT. Means for performing the functionality at block 1030 may comprise the memory 1260, the processing unit(s) 1210, the wireless communication interface 1230, the antenna 1232, and/or other components of a UE, as illustrated in FIG. 12.

At block 1040, the functionality comprises receiving, from each responder UE and based on the sending of the first reference signal, a second reference signal of each responder UE based on the one or more characteristics of the transmission of the second reference signal for each responder UE as determined by the initiator UE. The second reference signal of each responder UE may be received via an unlicensed spectrum. Means for performing the functionality at block 1040 may comprise processing unit(s) 1210, wireless communication interface 1230, antenna 1232, and/or other components of a UE, as illustrated in FIG. 12.

At block 1050, the functionality comprises sending to the group of responder UEs and based on receiving the second reference signal of each responder UE, a post-PRS message (also referred to as a third message) including at least an indication whether the second reference signal of each responder UE is received by the initiator UE. In some aspects, the third message may further include timing data related to a departure time of the first reference signal and timing data related to an arrival time of the second reference signal of each responder UE. The third message may be sent using a licensed spectrum. The third message may be sent as a broadcast to all the responder UEs with the same payload. Means for performing the functionality at block 1050 may comprise the memory 1260, the processing unit(s) 1210, the wireless communication interface 1230, the antenna 1232, and/or other components of a UE, as illustrated in FIG. 12.

At block 1060, the functionality comprise receiving, from each responder UE and based on the sending of the third message, a post-PRS message (also referred to as a fourth message) including timing data related to a departure time of the second reference signal of each responder UE, timing data related to an arrival time of the first reference signal, and a location of the responder UE at the departure time of the second reference signal of the responder UE. The fourth message may be received over a licensed spectrum. Means for performing the functionality at block 1040 may comprise processing unit(s) 1210, wireless communication interface 1230, antenna 1232, and/or other components of a UE, as illustrated in FIG. 12.

Figure 11:
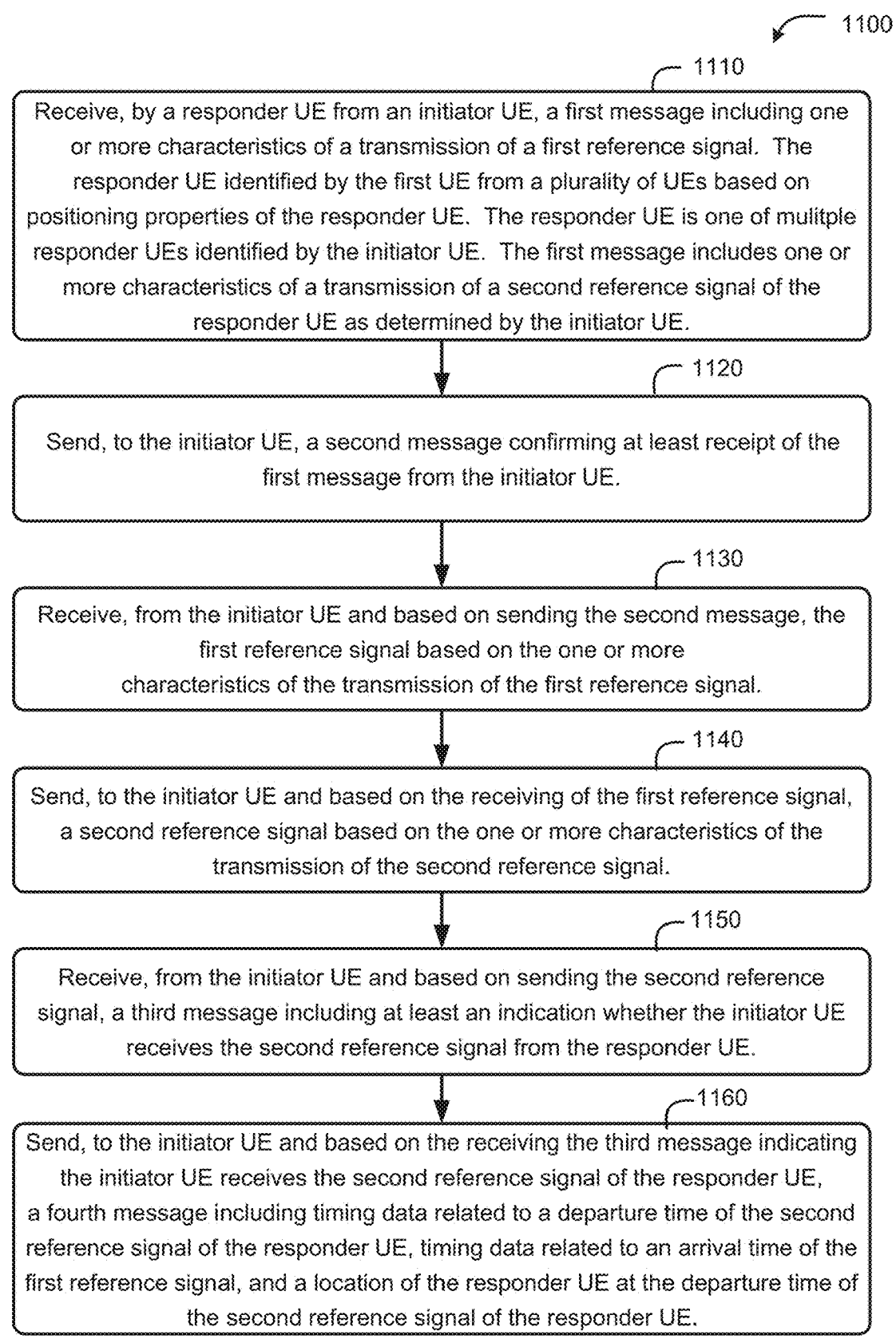
FIG. 11 is a flow diagram of an example process that may be performed by a responder UE that responds to the initiator UE, according to an embodiment.

FIG. 11 is a flow diagram of an example process that may be performed by a responder UE in a positioning session, according to some aspects. The positioning session may be initiated by an initiator UE based on positioning properties of the responder UE. The responder UE may be one of multiple responder UEs identified by the initiator UE based on their positioning properties. Means for performing the functionality illustrated in one or more of the blocks shown in FIG. 11 may be performed by hardware and/or software components of a UE. Example components of a UE are illustrated in FIG. 12 which are described in more detail below.

At block 1110, the functionality comprises receiving, from the initiator UE, a first message including one or more characteristics of a transmission of a first reference signal of the initiator UE. The one or more characteristics of the transmission of the first reference signal may include an ID of the first reference signal, timing data related to a time slot used by the initiator UE to send the first reference signal to the responder UE, and frequency data related to a frequency used by the initiator UE to send the first reference signal to the responder UE.

The first message may also include one or more characteristics of a transmission of a second reference signal of the responder UE. The one or more characteristics of the transmission of the second reference signal of the responder UE may be determined by the initiator UE on behalf of the responder UE. The one or more characteristics of the transmission of the second reference signal of one responder UE may be different from the one or more characteristics of the transmission of the second reference signal of another responder UE. The first message may further include information about when the responder UE may send its pre-PRS message (also referred to as a second message) to the initiator UE. Means for performing the functionality at block 1110 may comprise processing unit(s) 1210, wireless communication interface 1230, antenna 1232, and/or other components of a UE, as illustrated in FIG. 12.

At block 1120, the functionality comprises transmitting, to the initiator UE, a second message confirming that the responder UE has received the first message from the initiator UE. The second message from the responder UE may include frequency data related to a frequency used by the responder UE to send the second reference signal of the responder UE to the initiator UE. Means for performing the functionality at block 1120 may comprise processing unit(s) 1210, wireless communication interface 1230, antenna 1232, and/or other components of a UE, as illustrated in FIG. 12.

At block 1130, the functionality comprises receiving, from the initiator UE and based on transmitting the second message, the first reference signal from the initiator UE based on the one or more characteristics of the transmission of the first reference signal. The first reference signal may be received using an unlicensed spectrum. Means for performing the functionality at block 1130 may comprise processing unit(s) 1210, wireless communication interface 1230, antenna 1232, and/or other components of a UE, as illustrated in FIG. 12.

At block 1140, the functionality comprises sending, to the initiator UE and based on the receiving of the first reference signal, a second reference signal of the responder UE based on the one or more characteristics of the transmission of the second reference signal of the responder UE. The second reference signal may be transmitted using an unlicensed spectrum and may be subjected to LBT. Means for performing the functionality at block 1140 may comprise processing unit(s) 1210, wireless communication interface 1230, antenna 1232, and/or other components of a UE, as illustrated in FIG. 12.

At block 1150, the functionality comprises receiving, from the initiator UE and based on the transmitting the second reference signal, a third message including at least an indication that the second reference signal is received by the initiator UE. The third message may be received using a licensed spectrum. Means for performing the functionality at block 1150 may comprise processing unit(s) 1210, wireless communication interface 1230, antenna 1232, and/or other components of a UE, as illustrated in FIG. 12.

At block 1160, the functionality comprises sending, to the initiator UE and based on the receiving the third message, a fourth message including timing data related to a departure time of the second reference signal of the responder UE, timing data related to an arrival time of the first reference signal, and location of the responder UE at the departure time of the second reference signal of the responder UE. The fourth message may be transmitted using a licensed spectrum. Means for performing the functionality at block 1160 may comprise processing unit(s) 1210, wireless communication interface 1230, antenna 1232, and/or other components of a UE, as illustrated in FIG. 12.

FIG. 12 illustrates an embodiment of a UE 105, which can be utilized as described herein above (e.g., in association with FIGS. 7-11). For example, the UE 105 can perform one or more of the functions of the method shown in FIG. 10 and FIG. 11. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 12.

The UE 105 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 12, some embodiments may have a separate DSP 1220, depending on desired functionality. Location determination and/or other determinations based on wireless communication may be provided in the processing unit(s) 1210 and/or wireless communication interface 1230 (discussed below). The UE 105 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The UE 105 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1230 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1210, DSP 1220, and/or a processing unit within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1210 or DSP 1220.

The UE 105 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the UE 105 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the UE 105 (and/or processing unit(s) 1210 or DSP 1220 within UE 105). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments.

Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one" of if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for positioning of an initiator user equipment (UE), the method comprising: sending, to a responder UE, a reference signal message; receiving, from the responder UE, a responding reference signal message corresponding to the responder UE; and based on the receiving of the responding reference signal message of the responder UE: sending, to the responder UE, a first message including at least an indication that the initiator UE receives the responding reference signal message from the responder UE; and receiving, from the responder UE, a second message including timing data related to the responding reference signal message of the responding UE, and a location of the responder UE correlated to the timing data.

Clause 2. The method of clause 1, further comprising: determining a location of the initiator UE with respect to the location of each responder UE based on the timing data, the location of the responder UE, or a combination thereof.

Clause 3. The method of any one of clauses 1-2 wherein the timing data comprises a departure time of the responding reference signal message of the responder UE, an arrival time of the reference signal message at the responder UE, or a combination thereof.

Clause 4. The method of any one of clauses 1-3 further comprising identifying the responder UE from a plurality of UEs based on positioning properties of the responder UE in the plurality of UEs; sending, to the responder UE, a third message including: one or more characteristics of a transmission of the reference signal message; one or more characteristics of a transmission of the responding reference signal message corresponding to the responder UE; and information about when the responder UE can send a fourth message to the initiator UE; and receiving, from the responder UE, the fourth message confirming receipt of the third message by the responder UE.

Clause 5. The method of any one of clauses 1-4 wherein the receiving of the fourth message occurs prior to the sending of the reference signal message to the responder UE.

Clause 6. The method of any one of clauses 1-5 wherein the positioning properties of the responder UE include a direction that the responder UE is moving, a location confidence of the responder UE, a velocity of the responder UE, the location of the responder UE, or a combination thereof.

Clause 7. The method of any one of clauses 1-6 wherein the one or more characteristics of the transmission of the reference signal message include an identification (ID) of the reference signal message, timing data indicating a time when the reference signal message is sent to the responder UE, frequency data indicating a frequency used to send the reference signal message to the responder UE, or a combination thereof.

Clause 8. The method of any one of clauses 1-7 wherein the one or more characteristics of the transmission of the responding reference signal message of the responder UE include an identification (ID) of the responding reference signal message of the responder UE, timing data indicating a time when the responder UE sends the responding reference signal message, or a combination thereof.

Clause 9. The method of any one of clauses 1-8 wherein the identifying of the responder UE from the plurality of UEs is based on: the responder UE having a higher location confidence than a location confidence of the initiator UE; the responder UE moving in a direction different from a direction that the initiator UE is moving; or a combination thereof.

Clause 10. The method of any one of clauses 1-9 wherein the sending of the first message, the reference signal message, and the third message, and the receiving of the second message, the responding reference signal message and the fourth message of the responder UE are repeated for a number of cycles.

Clause 11. The method of any one of clauses 1-10 wherein the sending of the first message and the receiving of the second message are performed using a licensed spectrum.

Clause 12. The method of any one of clauses 1-11 wherein the sending of the reference signal message and the receiving of the responding reference signal message of the responder UE are performed using an unlicensed spectrum.

Clause 13. An initiator user equipment (UE) for wireless communication, the initiator UE comprising: one or more transceivers; memory; and one or more processors communicatively coupled with the memory and the one or more transceivers, the one or more processors configured to: send, to a responder UE, a reference signal message; receive, from the responder UE, a responding reference signal message corresponding to the responder UE; and based on the receipt of the responding reference signal message of the responder UE: send, to the responder UE, a first message including at least an indication that the initiator UE receives the responding reference signal message from the responder UE; and receive, from the responder UE, a second message including timing data related to the responding reference signal message of the responding UE, and a location of the responder UE correlated to the timing data.

Clause 14. The initiator UE of clause 13, wherein the one or more processors are further configured to determine a location of the initiator UE with respect to the location of each responder UE based on the timing data, the location of the responder UE, or a combination thereof.

Clause 15. The initiator UE of any one of clauses 13-14 wherein the timing data comprises a departure time of the responding reference signal message of the responder UE, an arrival time of the reference signal message at the responder UE, or a combination thereof.

Clause 16. The initiator UE of any one of clauses 13-15 wherein the one or more processors are further configured to: identify the responder UE from a plurality of UEs based on positioning properties of the responder UE in the plurality of UEs; send, to the responder UE, a third message including: one or more characteristics of a transmission of the reference signal message; one or more characteristics of a transmission of the responding reference signal message of the responder UE; and information about when the responder UE can send a fourth message to the initiator UE; and receive, from the responder UE, the fourth message confirming receipt of the third message by the responder UE.

Clause 17. The initiator UE of any one of clauses 13-16 wherein the positioning properties of the responder UE include a direction that the responder UE is moving, a location confidence of the responder UE, a velocity of the responder UE, the location of the responder UE, or a combination thereof.

Clause 18. The initiator UE of any one of clauses 13-17 wherein the one or more characteristics of the transmission of the reference signal message include an identification (ID) of the reference signal message, timing data indicating a time when the reference signal message is sent to the responder UE, frequency data indicating a frequency used to send the reference signal message to the responder UE, or a combination thereof.

Clause 19. The initiator UE of any one of clauses 13-18 wherein the one or more characteristics of the transmission of the responding reference signal message of the responder UE include an identification (ID) of the responding reference signal message of the responder UE, timing data indicating a time when the responder UE sends the responding reference signal message, or a combination thereof.

Clause 20. The initiator UE of any one of clauses 13-19 wherein the identification of the responder UE from the plurality of UEs is based on: the responder UE having a higher location confidence than a location confidence of the initiator UE; the responder UE moving in a direction different from a direction that the initiator UE is moving; or a combination thereof.

Clause 21. The initiator UE of any one of clauses 13-20 wherein the sending of the first message and the receipt of the second message are performed using a licensed spectrum.

Clause 22. The initiator UE of any one of clauses 13-21 wherein the sending of the reference signal message and the receipt of the responding reference signal message of the responder UE are performed using an unlicensed spectrum.

Clause 23. A method for positioning of an initiator user equipment (UE), the method performed by a responder UE and comprising: receiving, from the initiator UE, a first reference signal message; sending, to the initiator UE, a second reference signal message corresponding to the responder UE; and based on the sending of the second reference signal message: receiving, from the initiator UE, a third message including at least an indication that the initiator UE receives the second reference signal message; and sending, to the initiator UE, a fourth message including timing data related to the second reference signal message, and a location of the responder UE correlated to the timing data.

Clause 24. The method of clause 23, wherein the timing data comprises a departure time of the second reference signal message of the responder UE, an arrival time of the first reference signal message at the responder UE, or a combination thereof.

Clause 25. The method of any one of clauses 23-24 further comprising receiving, from the initiator UE, a first message including one or more characteristics of a transmission of the first reference signal message of the initiator UE, and one or more characteristics of a transmission of the second reference signal message corresponding to the responder UE, wherein the responder UE is identified by the initiator UE from a plurality of UEs based on positioning properties of the responder UE; and sending, to the initiator UE, a second message confirming receipt of the first message of the initiator UE.

Clause 26. The method of any one of clauses 23-25 wherein the positioning properties of the responder UE include a direction that the responder UE is moving, a location confidence of the responder UE, a velocity of the responder UE, a location of the responder UE, or a combination thereof.

Clause 27. The method of any one of clauses 23-26 wherein the one or more characteristics of the transmission of the first reference signal message include an identification (ID) of the first reference signal message, timing data related to a time slot used by the initiator UE to send the first reference signal message to the responder UE, frequency data related to a frequency used by the initiator UE to send the first reference signal message to the responder UE, or a combination thereof.

Clause 28. The method of any one of clauses 23-27 wherein the one or more characteristics of the transmission of the second reference signal message include an identification (ID) of the second reference signal message, timing data related to a time slot used by the responder UE to send the second reference signal message to the initiator UE, or a combination thereof.

Clause 29. A responder user equipment (UE) for wireless communication, the responder UE comprising: a transceiver; memory; and one or more processors communicatively coupled with the memory and the transceiver, the one or more processors configured to: receive, from an initiator UE, a first reference signal message; send, to the initiator UE, a second reference signal message corresponding to the responder UE; and based on the sending of the second reference signal message: receive, from the initiator UE, a third message including at least an indication that the initiator UE receives the second reference signal message; and send, to the initiator UE, a fourth message including timing data related to the second reference signal message, and a location of the responder UE correlated to the timing data.

Clause 30. The responder UE of clause 29, wherein the timing data comprises a departure time of the second reference signal message of the responder UE, an arrival time of the first reference signal message at the responder UE, or a combination thereof.

What is claimed is:

1. A method for positioning of an initiator user equipment (UE), the method comprising:
   sending, to a responder UE, a reference signal message;
   responsive to the sending of the reference signal message to the responder UE, receiving, from the responder UE, a responding reference signal message corresponding to the responder UE; and
   based on the receiving of the responding reference signal message of the responder UE:
      sending, to the responder UE, a first message including at least (i) an indication that the initiator UE receives the responding reference signal message from the responder UE, and (ii) first timing data, the first timing data being related to (a) the sending of the reference signal message, (b) the receiving of the responding reference signal message, or a combination of (a) and (b); and
      responsive to the sending of the first message to the responder UE, receiving, from the responder UE, a second message including second timing data related to the responding reference signal message of the responding UE, and a location of the responder UE correlated to the second timing data.

2. The method of claim 1, further comprising:
   determining a location of the initiator UE with respect to the location of each responder UE based on the timing data, the location of the responder UE, or a combination thereof.

3. The method of claim 2, wherein the timing data comprises a departure time of the responding reference signal message of the responder UE, an arrival time of the reference signal message at the responder UE, or a combination thereof.

4. The method of claim 1, further comprising:
   identifying the responder UE from a plurality of UEs based on positioning properties of the responder UE in the plurality of UEs;
   sending, to the responder UE, a third message including:
      one or more characteristics of a transmission of the reference signal message;
      one or more characteristics of a transmission of the responding reference signal message corresponding to the responder UE; and
      information about when the responder UE can send a fourth message to the initiator UE; and
   receiving, from the responder UE, the fourth message confirming receipt of the third message by the responder UE.

5. The method of claim 4, wherein the receiving of the fourth message occurs prior to the sending of the reference signal message to the responder UE.

6. The method of claim 4, wherein the positioning properties of the responder UE include a direction that the responder UE is moving, a location confidence of the responder UE, a velocity of the responder UE, the location of the responder UE, or a combination thereof.

7. The method of claim 4, wherein the one or more characteristics of the transmission of the reference signal message include an identification (ID) of the reference signal message, timing data indicating a time when the reference signal message is sent to the responder UE, frequency data indicating a frequency used to send the reference signal message to the responder UE, or a combination thereof.

8. The method of claim 4, wherein the one or more characteristics of the transmission of the responding reference signal message of the responder UE include an identification (ID) of the responding reference signal message of the responder UE, timing data indicating a time when the responder UE sends the responding reference signal message, or a combination thereof.

9. The method of claim 4, wherein the identifying of the responder UE from the plurality of UEs is based on:
   the responder UE having a higher location confidence than a location confidence of the initiator UE;
   the responder UE moving in a direction different from a direction that the initiator UE is moving; or
   a combination thereof.

10. The method of claim 4, wherein the sending of the first message, the reference signal message, and the third message, and the receiving of the second message, the responding reference signal message and the fourth message of the responder UE are repeated for a number of cycles.

11. The method of claim 1, wherein the sending of the first message and the receiving of the second message are performed using a licensed spectrum.

12. The method of claim 1, wherein the sending of the reference signal message and the receiving of the responding reference signal message of the responder UE are performed using an unlicensed spectrum.

13. An initiator user equipment (UE) for wireless communication, the initiator UE comprising:
   one or more transceivers;
   one or more memory; and
   one or more processors communicatively coupled with the memory and the one or more transceivers, the one or more processors configured to:
      send, to a responder UE, a reference signal message;
      responsive to the sending of the reference signal message to the responder UE, receive, from the responder UE, a responding reference signal message corresponding to the responder UE; and
based on the receipt of the responding reference signal message of the responder UE:
send, to the responder UE, a first message including at least (i) an indication that the initiator UE receives the responding reference signal message from the responder UE, and (ii) first timing data, the first timing data being related to (a) the sending of the reference signal message, (b) the receipt of the responding reference signal message, or a combination of (a) and (b); and
responsive to the sending of the first message to the responder UE, receive, from the responder UE, a second message including second timing data related to the responding reference signal message of the responding UE, and a location of the responder UE correlated to the second timing data.

14. The initiator UE of claim 13, wherein the one or more processors are further configured to determine a location of the initiator UE with respect to the location of each responder UE based on the timing data, the location of the responder UE, or a combination thereof.

15. The initiator UE of claim 14, wherein the timing data comprises a departure time of the responding reference signal message of the responder UE, an arrival time of the reference signal message at the responder UE, or a combination thereof.

16. The initiator UE of claim 13, wherein the one or more processors are further configured to:
identify the responder UE from a plurality of UEs based on positioning properties of the responder UE in the plurality of UEs;
send, to the responder UE, a third message including:
one or more characteristics of a transmission of the reference signal message;
one or more characteristics of a transmission of the responding reference signal message of the responder UE; and
information about when the responder UE can send a fourth message to the initiator UE; and
receive, from the responder UE, the fourth message confirming receipt of the third message by the responder UE.

17. The initiator UE of claim 16, wherein the positioning properties of the responder UE include a direction that the responder UE is moving, a location confidence of the responder UE, a velocity of the responder UE, the location of the responder UE, or a combination thereof.

18. The initiator UE of claim 16, wherein the one or more characteristics of the transmission of the reference signal message include an identification (ID) of the reference signal message, timing data indicating a time when the reference signal message is sent to the responder UE, frequency data indicating a frequency used to send the reference signal message to the responder UE, or a combination thereof.

19. The initiator UE of claim 16, wherein the one or more characteristics of the transmission of the responding reference signal message of the responder UE include an identification (ID) of the responding reference signal message of the responder UE, timing data indicating a time when the responder UE sends the responding reference signal message, or a combination thereof.

20. The initiator UE of claim 16, wherein the identification of the responder UE from the plurality of UEs is based on:

the responder UE having a higher location confidence than a location confidence of the initiator UE;
the responder UE moving in a direction different from a direction that the initiator UE is moving; or
a combination thereof.

21. The initiator UE of claim 13, wherein the sending of the first message and the receipt of the second message are performed using a licensed spectrum.

22. The initiator UE of claim 13, wherein the sending of the reference signal message and the receipt of the responding reference signal message of the responder UE are performed using an unlicensed spectrum.

23. A method for positioning of an initiator user equipment (UE), the method performed by a responder UE and comprising:
receiving, from the initiator UE, a first reference signal message;
responsive to the receiving of the first reference signal message, sending, to the initiator UE, a second reference signal message corresponding to the responder UE; and
based on the sending of the second reference signal message:
receiving, from the initiator UE, a third message including at least (i) an indication that the initiator UE receives the second reference signal message, and (ii) first timing data, the first timing data being related to (a) the receiving of the first reference signal message, (b) the sending of the second reference signal message, or a combination of (a) and (b); and
sending, to the initiator UE, a fourth message including second timing data related to the second reference signal message, and a location of the responder UE correlated to the second timing data.

24. The method of claim 23, wherein the timing data comprises a departure time of the second reference signal message of the responder UE, an arrival time of the first reference signal message at the responder UE, or a combination thereof.

25. The method of claim 23, further comprising:
receiving, from the initiator UE, a first message including one or more characteristics of a transmission of the first reference signal message of the initiator UE, and one or more characteristics of a transmission of the second reference signal message corresponding to the responder UE, wherein the responder UE is identified by the initiator UE from a plurality of UEs based on positioning properties of the responder UE; and
sending, to the initiator UE, a second message confirming receipt of the first message of the initiator UE.

26. The method of claim 25, wherein the positioning properties of the responder UE include a direction that the responder UE is moving, a location confidence of the responder UE, a velocity of the responder UE, a location of the responder UE, or a combination thereof.

27. The method of claim 25, wherein the one or more characteristics of the transmission of the first reference signal message include an identification (ID) of the first reference signal message, timing data related to a time slot used by the initiator UE to send the first reference signal message to the responder UE, frequency data related to a frequency used by the initiator UE to send the first reference signal message to the responder UE, or a combination thereof.

28. The method of claim 25, wherein the one or more characteristics of the transmission of the second reference signal message include an identification (ID) of the second reference signal message, timing data related to a time slot used by the responder UE to send the second reference signal message to the initiator UE, or a combination thereof.

29. A responder user equipment (UE) for wireless communication, the responder UE comprising:
- one or more transceivers;
- one or more memory; and
- one or more processors communicatively coupled with the memory and the transceiver, the one or more processors configured to:
  - receive, from an initiator UE, a first reference signal message;
  - responsive to the receiving of the first reference signal message, send, to the initiator UE, a second reference signal message corresponding to the responder UE; and
  - based on the sending of the second reference signal message:
    - receive, from the initiator UE, a third message including at least (i) an indication that the initiator UE receives the second reference signal message, and (ii) first timing data, the first timing data being related to (a) the receipt of the first reference signal message, (b) the sending of the second reference signal message, or a combination of (a) and (b); and
    - send, to the initiator UE, a fourth message including second timing data related to the second reference signal message, and a location of the responder UE correlated to the second timing data.

30. The responder UE of claim 29, wherein the timing data comprises a departure time of the second reference signal message of the responder UE, an arrival time of the first reference signal message at the responder UE, or a combination thereof.

* * * * *